United States Patent
Dai et al.

(10) Patent No.: US 9,609,640 B2
(45) Date of Patent: Mar. 28, 2017

(54) METHOD AND DEVICE FOR SENDING AND RECEIVING EPDCCH, BASE STATION, AND USER EQUIPMENT

(71) Applicant: ZTE Corporation, Shenzhen, Guangdong Province (CN)

(72) Inventors: Bo Dai, Shenzhen (CN); Yijian Chen, Shenzhen (CN); Jing Shi, Shenzhen (CN); Yunfeng Sun, Shenzhen (CN); Zhisong Zuo, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/417,422

(22) PCT Filed: Jul. 31, 2013

(86) PCT No.: PCT/CN2013/080485
§ 371 (c)(1),
(2) Date: Jan. 26, 2015

(87) PCT Pub. No.: WO2013/178184
PCT Pub. Date: Dec. 5, 2013

(65) Prior Publication Data
US 2015/0215904 A1  Jul. 30, 2015

(30) Foreign Application Priority Data
Jul. 31, 2012 (CN) .......................... 2012 1 0269125

(51) Int. Cl.
*H04W 72/04* (2009.01)
*H04W 72/00* (2009.01)
*H04L 5/00* (2006.01)

(52) U.S. Cl.
CPC ......... *H04W 72/042* (2013.01); *H04L 5/0053* (2013.01); *H04W 72/00* (2013.01); *H04L 5/0048* (2013.01)

(58) Field of Classification Search
CPC .... H04B 7/0452; H04B 7/0602; H04B 7/024; H04W 72/04; H04W 72/0406;
(Continued)

(56) References Cited

U.S. PATENT DOCUMENTS 8,982,693 B2 * 3/2015 Krishnamurthy ..... H04W 52/50
370/216
9,001,798 B2 * 4/2015 Papasakellariou H04W 72/0406
370/336
(Continued)

FOREIGN PATENT DOCUMENTS

| CN | 102395206 | 3/2012 |
| CN | 102420685 | 4/2012 |
| CN | 102612094 | 7/2012 |

OTHER PUBLICATIONS

International Search Report for International Paten Application No. PCT/CN2013/080485 mailed Nov. 7, 2013.

*Primary Examiner* — Bunjob Jaroenchonwanit
(74) *Attorney, Agent, or Firm* — McAndrews, Held & Malloy, Ltd.

(57) ABSTRACT

Provided are a method and a device for sending and receiving an ePDCCH, a base station, and user equipment. The method includes: a base station mapping enhanced resource element groups (eREGs) corresponding to an ePDCCH to different resource elements, wherein each of the eREGs corresponding to the ePDCCH is located in one physical resource block pair; and the base station sending the ePDCCH on the resource elements. The disclosure improves the reliability and resource utilization of ePDCCH transmission.

21 Claims, 5 Drawing Sheets

(58) Field of Classification Search
CPC .. H04W 72/042; H04W 72/12; H04L 1/0061; H04L 1/1812; H04L 1/1861; H04L 5/0023; H04L 5/0053; H04J 11/00; H04J 11/0053
See application file for complete search history.

(56) References Cited

U.S. PATENT DOCUMENTS

| | | | | |
|---|---|---|---|---|
| 9,072,086 | B2* | 6/2015 | Papasakellariou | H04W 72/0406 |
| 2012/0113816 | A1* | 5/2012 | Bhattad | H04L 5/0032 370/246 |
| 2013/0039299 | A1* | 2/2013 | Papasakellariou | H04L 1/0073 370/329 |
| 2013/0114522 | A1* | 5/2013 | Frenne | H04L 5/0094 370/329 |
| 2013/0194931 | A1* | 8/2013 | Lee | H04L 5/0053 370/241 |
| 2013/0195067 | A1* | 8/2013 | Khoshnevis | H04L 5/0094 370/330 |
| 2013/0250880 | A1* | 9/2013 | Liao | H04W 72/042 370/329 |
| 2013/0294368 | A1* | 11/2013 | Bendlin | H04W 72/042 370/329 |
| 2013/0301561 | A1* | 11/2013 | Sartori | H04W 72/04 370/329 |
| 2013/0301608 | A1* | 11/2013 | Frenne | H04W 74/004 370/331 |
| 2013/0308557 | A1* | 11/2013 | Gao | H04W 72/0406 370/329 |
| 2014/0003375 | A1* | 1/2014 | Nam | H04W 72/0406 370/329 |
| 2014/0126487 | A1* | 5/2014 | Chen | H04B 15/00 370/329 |
| 2014/0205035 | A1* | 7/2014 | Ko | H04B 7/0613 375/267 |
| 2015/0131587 | A1* | 5/2015 | Mazzarese | H04W 72/042 370/329 |
| 2015/0163782 | A1* | 6/2015 | Ji | H04W 72/0406 370/329 |
| 2015/0296491 | A1* | 10/2015 | Nam | H04W 72/0406 370/329 |

* cited by examiner

METHOD AND DEVICE FOR SENDING AND RECEIVING EPDCCH, BASE STATION, AND USER EQUIPMENT

CROSS-REFERENCE TO RELATED APPLICATIONS/INCORPORATION BY REFERENCE

This application is a 371 of International Patent Application No. PCT/CN2013/080485, filed Jul. 31, 2013, entitled "METHOD AND DEVICE FOR SENDING AND RECEIVING EPDCCH, BASE STATION, AND USER EQUIPMENT", which claims priority to Chinese Patent Application No. 201210269125.5, filed Jul. 31, 2012, entitled "EPDCCH TRANSMITTING AND RECEIVING METHOD, DEVICE, BASE STATION AND USER DEVICE". The above-identified applications are hereby incorporated herein by reference in their entirety.

TECHNICAL FIELD

The present document relates to the field of communication, and specifically, to a method and device for sending and receiving enhanced Physical Downlink Control Channel (ePDCCH), base station, and user equipment.

BACKGROUND

The long term evolution (LTE) system has two frame structures. The frame structure Type 1 is applicable to frequency division duplex (FDD) and frequency division half-duplex. Each radio frame has a length of 10 ms, and consists of 20 slots, each of which has a length of 0.5 ms and which are numbered from 0 to 19. Here, one subframe consists of two continuous slots, e.g., subframe i consists of two continuous slots $2i$ and $2i+1$.

The frame structure Type 2 is applicable to time division duplex (TDD). One radio frame has a length of 10 ms, and consists of two half-frames each having a length of 5 ms. One half-frame consists of 5 subframes each having a length of 1 ms. The special subframes consist of a downlink special subframe (DwPTS), a guard period (GP), and an uplink special subframe (UpPTS), and have a total length of 1 ms. Each subframe i consists of two slots $2i$ and $2i+1$ each having a length of 0.5 ms ($15360 \times T_s$).

In the above-mentioned two frame structures, for a normal cyclic prefix (normal CP), one slot contains 7 symbols each having a length of 66.7 us, wherein the length of the CP in the first symbol is 5.21 us, and the length of the CP in each of the rest 6 symbols is 4.69 us; for an extended cyclic prefix (extended CP), one slot contains 6 symbols each having a CP length of 16.67 us. The special subframe configuration is shown in Table 1, wherein $30720 \cdot T_s = 1$ ms.

TABLE 1

Special Subframe Configuration.

| Special Subframe Configuration | Downlink using normal cyclic prefix | | | Downlink using extended cyclic prefix | | |
|---|---|---|---|---|---|---|
| | | UpPTS | | | UpPTS | |
| | DwPTS | Uplink using normal cyclic prefix | Uplink using extended cyclic prefix | DwPTS | Uplink using normal cyclic prefix | Uplink using extended cyclic prefix |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |
| 5 | $6592 \cdot T_S$ | $4384 \cdot T_S$ | $5120 \cdot T_S$ | $20480 \cdot T_S$ | | |
| 6 | $19760 \cdot T_S$ | | | $23040 \cdot T_S$ | | |
| 7 | $21952 \cdot T_S$ | | | — | — | — |
| 8 | $24144 \cdot T_S$ | | | — | — | — |

One resource element (RE) is an orthogonal frequency division multiplexing (OFDM) symbol in a time domain, and is a sub-carrier in a frequency domain. One slot contains $N_{symb}^{DL}$ OFDM symbols. One resource block (RB) consists of $N_{symb}^{DL} \times N_{sc}^{RB}$ resource elements, and is one slot in a time domain and 180 kHz in a frequency domain. When the subframe cyclic prefix is a normal cyclic prefix, one resource block is shown in FIG. 1. The same frequency domain in one subframe corresponds to a pair of resource blocks (also referred to as RB-pair).

Three downlink physical control channels are defined in LTE as follows: physical control format indicator channel (PCFICH), physical hybrid automatic retransmission request indicator channel (PHICH), and physical downlink control channel (PDCCH). The physical control format Indicator channel carries information that indicates the time domain size of the downlink control region in the subframe.

The physical downlink control channel (PDCCH) is mapped to physical resources, with a control channel element (CCE) as a unit. One CCE has a size of 9 resource element groups (REGs), i.e., 36 resource elements. The PDCCH has four aggregation levels which respectively represent that one PDCCH occupies 1, 2, 4 and 8 CCEs, called as aggregation level 1, aggregation level 2, aggregation level 4 and aggregation level 8; correspondingly, the 4 aggregation levels correspond to four formats of PDCCH, that is, the aggregation level represents the size of the physical resources occupied by the physical downlink control channel. In addition, the search space of the physical downlink control channel of user equipment is partitioned into a common search space and a UE-specific search space.

In the LTE system Release (R) 8/9, a common reference signal (CRS) is designed for measuring the channel quality and demodulating received data symbols. A UE may measure a channel by the CRS so as to support the UE to perform cell reselection and switch to a target cell. In the LTE R10, two reference signals, i.e., channel state information reference signal (CSI-RS) and demodulation reference signal (DMRS), are respectively designed for further improving the average spectrum efficiency and cell edge spectrum efficiency of a cell and the throughput rate of each UE, wherein CSI-RS is used for measuring a channel, DMRS is used for demodulating a downlink shared channel. The demodulation using DMRS may reduce the interference between different receiving sides and between different cells by a beam method, reduce the performance degradation caused by codebook granularity, and reduce the cost of downlink control signalling to some extent.

In a heterogeneous network, since there is strong interference among different types of base stations, and considering the interference of a macro eNodeB on a Pico eNodeB and the interference of a Home eNodeB on a Macro eNodeB, LTE R11 provides a method of multiple antenna transmission based on user-dedicated pilot frequency to solve the problem of interference; in addition, the coordination of the inter-cell interference in the frequency domain may be implemented by mapping PDCCH to a PDSCH region in a frequency division multiplexing mode similar to PDSCH multiplexing mode. Such enhanced PDCCH is referred to as enhanced PDCCH (ePDCCH). At present, ePDCCH mapping methods mainly include continuous mapping and discrete mapping. In addition, one resource block pair may carry 2, 3 or 4 ePDCCHs, and one resource block pair uses one or more of antenna ports {107, 108, 109, 110}, as shown in FIG. 2. In addition, a search space of the enhanced Physical Downlink Control Channel of UE also includes a UE-specific search space.

As to the problem of poor ePDCCH transmission performance caused by the ePDCCH processing method in the related art, no effective solution has been proposed at present.

SUMMARY

As to the problem of poor ePDCCH transmission performance caused by the ePDCCH processing method in the related art, the embodiments of the present application provide a method and device for sending and receiving enhanced Physical Downlink Control Channel, base station, and user equipment, to at least solve the problem.

According to one embodiment of the disclosure, provided is a method for sending an ePDCCH, including: a base station mapping enhanced resource element groups (eREGs) corresponding to the ePDCCH to different resource elements, wherein each of the eREGs corresponding to the ePDCCH is located in one physical resource block pair; and the base station sending the ePDCCH on the resource elements.

In the described embodiment, the one physical resource block pair includes n eREGs, the n eREGs on different physical resource blocks are mapped to different resource element positions in the different physical resource blocks, where n is an integer greater than or equal to 1.

In the described embodiment, the base station mapping the eREGs corresponding to the ePDCCH to different resource elements includes: the base station partitioning modulation symbols corresponding to the transmitted ePDCCH into resource groups, the base station sorting modulation symbols in the resource groups according to a predefined rule, and the base station mapping the sorted modulation symbols to the resource elements; or the base station partitioning the physical resource block pairs corresponding to the ePDCCH into eREGs, and the base station mapping the ePDCCH to predefined eREGs.

In the described embodiment, the base station sorting the modulation symbols in the resource groups according to the predefined rule includes: the base station using an order of modulated modulation symbols; the base station sorting the modulation symbols in the resource groups according to the serial number of the eREG first and then the serial number of the modulation symbol in the eREG; the base station inputting the modulated modulation symbols into a subblock interleaver, and sorting the modulation symbols in the resource groups according to the order of the modulation symbols after being output from the subblock interleaver.

In the described embodiment, before the base station mapping the sorted modulation symbols to physical resources, the method further includes: the base station performing cyclic shift for the sorted modulation symbols.

In the described embodiment, the base station performs cyclic shift for the sorted modulation symbols according to at least one of the following: serial number of resource group, serial number of physical resource block corresponding to resource group, cell identity, serial number of subframe, and cyclic shift instruction signalling.

In the described embodiment, the base station mapping the sorted modulation symbols to physical resources includes: the base station mapping the sorted modulation symbols to the resource elements according to one of the following manners: sequential mapping of physical resource blocks one by one, according to an order of a time domain first and then a frequency domain; and sequential mapping of physical resource blocks one by one, according to an order of the frequency domains first and then the time domain.

In the described embodiment, the base station partitioning the physical resource block pairs corresponding to the ePDCCH into eREGs includes: the base station numbering the resource elements used for ePDCCH according to an order of the time domain first and then the frequency domain or according to an order of the frequency domain first and then the time domain; and partitioning the numbered resource elements into eREGs.

In the described embodiment, partitioning the numbered resource elements into eREGs includes one of the following: partitioning the numbered resource elements into the eREGs at equal intervals; partitioning the numbered resource elements into the eREGs in a continuous manner according to the sequence of the numbered resource elements; inputting the numbered resource elements into a subblock interleaver, and partitioning the resource elements output from the subblock interleaver into the eREGs sequentially; and inputting the numbered resource element into the subblock interleaver, performing cyclic shift for the resource elements output from the subblock interleaver, and then partitioning resource elements subjected to the cyclic shift into the eREGs.

In the described embodiment, the base station performs cyclic shift for the sorted modulation symbols according to at least one of the following: serial number of resource group, serial number of physical resource block corresponding to resource group, cell identity, serial number of subframe, and cyclic shift instruction signalling.

In the described embodiment, an initial time domain position of physical resources corresponding to the ePDCCH is the same as an initial time domain position of a physical downlink shared channel (PDSCH) scheduled by the ePDCCH, wherein the ePDCCH and the PDSCH are in a same serving cell.

In the described embodiment, a frequency domain position of physical resources corresponding to the ePDCCH is a signalling configured or predefined position, wherein the predefined position includes one of the following: two sidebands of a system bandwidth, N physical resource blocks of each of the two sidebands of the system bandwidth, N physical resource blocks in a system which are mapped at intervals, and N physical resource blocks at the center of the system bandwidth, where, N is an integer greater than 0.

In the described embodiment, when downlink control information corresponding to a PDSCH of a serving cell is carried by the ePDCCH, an initial time domain position of the PDSCH of the serving cell is determined according to an initial symbol indication signalling.

In the described embodiment, the base station encodes the ePDCCH according to physical resources with one or more predefined physical resource blocks removed, wherein the one or more predefined physical resource blocks are the same as one or more physical resource blocks where a secondary synchronization channel is located, and eREGs corresponding to the one or more predefined physical resource blocks do not carry the ePDCCH.

In the described embodiment, mapping the eREGs corresponding to the ePDCCH to different resource elements includes: mapping of virtual eREGs to the eREGs, wherein the eREGs correspond to physical resources, the virtual eREGs correspond to logical units of the ePDCCH; and the virtual eREGs comprise continuous virtual eREGs and discrete virtual eREGs, wherein the continuous virtual eREGs are mapped to eREGs having the same serial numbers as the continuous virtual eREGs, and the discrete virtual eREGs are mapped to predefined eREGs.

In the described embodiment, mapping the discrete virtual eREGs to the predefined eREGs includes: partitioning discrete eREGs into one or more discrete virtual eREG sets; partitioning the eREGs into one or more eREG sets; and setting the one or more discrete virtual eREG sets and the one or more eREG sets in a one-to-one correspondence, wherein the number of discrete virtual eREGs contained in each discrete virtual eREG set is equal to the number of eREGs contained in each eREG set.

In the described embodiment, the correspondences between the discrete virtual eREGs in the discrete virtual eREG set and the eREGs in the eREG set include:

when the eREG set contains 32 eREGs, the eREGs in the eREG set are numbered as a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31, and the discrete virtual eREGs in the discrete virtual eREG set are numbered as b0, b1, b2, b3, b4, b5, b6, b7, b8, b9, b10, b11, b12, b13, b14, b15, b16, b17, b18, b19, b20, b21, b22, b23, b24, b25, b26, b27, b28, b29, b30, and b31, the correspondence between the discrete virtual eREGs in the discrete virtual eREG set and the eREGs in the eREGs being one of the following:

a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 respectively correspond to b0, b16, b1, b17, b2, b18, b3, b19, b4, b20, b5, b21, b6, b22, b7, b23, b8, b24, b9, b25, b10, b26, b11, b27, b12, b28, b13, b29, b14, b30, b15, and b31;

a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 respectively correspond to b0, b16, b4, b20, b2, b18, b6, b22, b1, b17, b5, b21, b3, b19, b7, b23, b8, b24, b12, b28, b10, b26, b14, b30, b9, b25, b13, b29, b11, b27, b15, and b31;

a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 respectively correspond to b0, b16, b4, b20, b1, b17, b5, b21, b2, b18, b6, b22, b3, b19, b7, b23, b8, b24, b12, b28, b9, b25, b13, b29, b10, b26, b14, b30, b11, b27, b15, and b31;

a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 respectively correspond to b0, b16, b2, b18, b1, b17, b3, b19, b4, b20, b6, b22, b5, b21, b7, b23, b8, b24, b10, b26, b9, b26, b11, b27, b12, b28, b14, b30, b13, b29, b15, and b31;

a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 respectively correspond to b0, b16, b8, b24, b1, b17, b9, b25, b2, b18, b10, b26, b3, b19, b11, b27, b4, b20, b12, b28, b5, b21, b13, b29, b6, b22, b14, b30, b7, b23, b15, and b31;

a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 respectively correspond to b0, b16, b8, b24, b2, b18, b10, b26, b1, b17, b9, b25, b3, b19, b11, b27, b4, b20, b12, b28, b6, b22, b14, b30, b5, b21, b13, b29, b7, b23, b15, and b31; and a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 respectively correspond to b0, b16, b8, b24, b4, b20, b12, b28, b1, b17, b9, b25, b5, b21, b13, b29, b2, b18, b10, b26, b6, b22, b14, b30, b3, b19, b11, b27, b7, b23, b15, and b31;

when the eREG set contains 16 eREGs, the discrete virtual eREGs in the discrete virtual eREG set are numbered as a0, a1, a2, a3, a4, a5, a6, a7, a8, a9, a10, a11, a12, a13, a14, and a15, and the eREGs in the eREG set are numbered as b0, b1, b2, b3, b4, b5, b6, b7, b8, b9, b10, b11, b12, b13, b14, and b15, the correspondence between the discrete virtual eREGs in the discrete virtual eREG set and the eREGs in the eREG set being one of the following:

a0, a1, a2, a3, a4, a5, a6, a7, a8, a9, a10, a11, a12, a13, a14, and a15 respectively correspond to b0, b8, b1, b9, b2, b10, b3, b11, b4, b12, b5, b13, b6, b14, b7, and b15;

a0, a1, a2, a3, a4, a5, a6, a7, a8, a9, a10, a11, a12, a13, a14, and a15 respectively correspond to b0, b8, b2, b10, b1, b9, b3, b11, b4, b12, b6, b14, b5, b13, b7, and b15;

a0, a1, a2, a3, a4, a5, a6, a7, a8, a9, a10, a11, a12, a13, a14, and a15 respectively correspond to b0, b8, b4, b12, b1, b9, b5, b13, b2, b10, b6, b14, b3, b11, b7, and b15; and a0, a1, a2, a3, a4, a5, a6, a7, a8, a9, a10, a11, a12, a13, a14, and a15 respectively correspond to b0, b8, b4, b12, b2, b10, b6, b14, b1, b9, b5, b13, b3, b11, b7, and b15;

when the eREG set contains 8 eREGs, the discrete eREGs in the discrete virtual eREG set are numbered as a0, a1, a2, a3, a4, a5, a6, and a7, and the eREGs in the eREG set are numbered as b0, b1, a2, a3, a4, a5, a6, and b7, the correspondence between the discrete virtual eREGs in the discrete virtual eREG set and the eREGs in the eREG set being one of the following:

a0, a1, a2, a3, a4, a5, a6, and a7 respectively correspond to b0, b4, b1, b5, b2, b6, b3, and b7; and a0, a1, a2, a3, a4, a5, a6, and a7 respectively correspond to b0, b4, b2, b6, b1, b5, b3, and b7.

In the described embodiment, before inputting the modulation symbols or, the resource elements into the subblock interleaver, the method further includes: adding Null modulation symbols, wherein the number of the added Null modulation symbols is an integer greater than or equal to 0.

In the described embodiment, the one physical resource block pair contains n eREGs, wherein the n value corresponding to the physical resource block with a normal cyclic prefix subframe is the same as the n value corresponding to the physical resource block with an extended cyclic prefix subframe; or, the one physical resource block contains n eREGs, wherein the n value is determined according to a predefined scenario, wherein the predefined scenario includes at least one of the following: extended cyclic prefix configured general subframes, normal cyclic prefix configured general subframes, an extended cyclic prefix configured special subframe set 1, an extended cyclic prefix configured special subframe set 2, a normal cyclic prefix configured special subframe set 1, and normal cyclic prefix configured special subframe set 2, and n is an integer greater than or equal to 1.

In the described embodiment, the normal cyclic prefix configured special subframe set 1 includes special subframe configurations 3, 4 and 8; or the normal cyclic prefix configured special subframe set 1 includes special subframe configurations 1, 2, 6, 7, 3, 4, and 8;

the normal cyclic prefix configured special subframe set 2 includes special subframe configurations 1, 2, 6, and 7;

the extended cyclic prefix configured special subframe set 1 includes special subframe configurations 1, 2, 3, 5, and 6; or the extended cyclic prefix configured special subframe set 1 includes special subframe configurations 1, 2, 3, 4, 5, and 6;

the extended cyclic prefix configured special subframe set 2 includes a special subframe configuration 4.

According to another embodiment of the disclosure, also provided is a method for receiving an ePDCCH, including: user equipment (UE) determining resource elements to which enhanced resource element groups (eREGs) corresponding to the ePDCCH are mapped, wherein each of the eREGs corresponding to the ePDCCH is located in one physical resource block pair; and the UE receiving the ePDCCH on the resource elements.

In the described embodiment, the eREGs corresponding to ePDCCH are mapped to the different resource elements by the following manner: the base station partitioning the physical resource block pairs corresponding to the ePDCCH into eREGs; and the base station mapping the ePDCCH to predefined eREGs.

In the described embodiment, the base station partitioning the physical resource block pairs corresponding to the ePDCCH into the eREGs includes: the base station numbering resource elements used for ePDCCH according to an order of a time domain first and then a frequency domain or according to an order of the frequency domain first and then the time domain; and partitioning the numbered resource elements into eREGs.

In the described embodiment, partitioning the numbered resource elements into eREGs includes one of the following: partitioning the numbered resource elements into the eREGs at equal intervals; partitioning the numbered resource elements into the eREGs in a continuous manner according to the sequence of the numbered resource elements; inputting the numbered resource elements into a subblock interleaver, and partitioning the resource elements output from the subblock interleaver into the eREGs sequentially; and inputting the numbered resource element into the subblock interleaver, performing cyclic shift for the resource elements output from the subblock interleaver, and then partitioning resource elements subjected to the cyclic shift into the eREGs.

In the described embodiment, an initial time domain position of physical resources corresponding to the ePDCCH is the same as an initial time domain position of a physical downlink shared channel (PDSCH) scheduled by the ePDCCH, wherein the ePDCCH and the PDSCH are in a same serving cell.

In the described embodiment, mapping the eREGs corresponding to the ePDCCH to different resource elements includes: mapping of virtual eREGs to the eREGs, wherein the eREGs correspond to physical resources, the virtual eREGs correspond to logical units of the ePDCCH; and the virtual eREGs include continuous virtual eREGs and discrete virtual eREGs, wherein the continuous virtual eREGs are mapped to eREGs having the same serial numbers as the continuous virtual eREGs, and the discrete virtual eREGs are mapped to predefined eREGs.

In the described embodiment, mapping the discrete virtual eREGs to the predefined eREGs includes: partitioning discrete eREGs into one or more discrete virtual eREG sets; partitioning the eREGs into one or more eREG sets; and setting the one or more discrete virtual eREG sets and the one or more eREG sets in a one-to-one correspondence, wherein the number of discrete virtual eREGs contained in each discrete virtual eREG set is equal to the number of eREGs contained in each eREG set.

In the described embodiment, the one physical resource block pair contains n eREGs, wherein the n value corresponding to the physical resource block with a normal cyclic prefix subframe is the same as the n value corresponding to the physical resource block with an extended cyclic prefix subframe; or, the one physical resource block contains n eREGs, wherein the n value is determined according to a predefined scenario, wherein the predefined scenario includes at least one of the following: extended cyclic prefix configured general subframes, normal cyclic prefix configured general subframes, an extended cyclic prefix configured special subframe set 1, an extended cyclic prefix configured special subframe set 2, a normal cyclic prefix configured special subframe set 1, and a normal cyclic prefix configured special subframe set 2, and n is an integer greater than or equal to 1. The discrete virtual eREG sets and the eREG sets are set in a one-to-one correspondence, wherein the number of discrete virtual eREGs contained in each discrete virtual eREG set is equal to the number of eREGs contained in each eREG set.

According to still another embodiment of the disclosure, also provided is a device for sending an ePDCCH applied to a base station, including:

a first mapping component configured to map enhanced resource element groups (eREGs) corresponding to the ePDCCH to different resource elements, wherein each of the eREGs corresponding to the ePDCCH is located in one physical resource block pair; and a sending component configured to send the ePDCCH on the resource elements.

In the described embodiment, the one physical resource block includes n eREGs, the n eREGs on different physical resource blocks are mapped to different resource element positions in the different physical resource blocks, where n is an integer greater than or equal to 1.

In the described embodiment, the first mapping component includes: a first partitioning component configured to partition modulation symbols corresponding to the transmitted ePDCCH into resource groups; a sorting component configured to sort the modulation symbols in the resource groups according to a predefined rule; a second mapping component configured to map the sorted modulation symbols to the resource elements; or a second partitioning component configured to partition the physical resource block pairs corresponding to the ePDCCH into eREGs; and a third mapping component configured to map the ePDCCH to the predefined eREGs.

In the described embodiment, the sorting component is configured to sort the modulation symbols in the resource groups according to one of the following manners: using an order of the modulated modulation symbols; sorting the modulation symbols in the resource groups according to the serial number of the eREG first and then the serial number of the modulation symbol in the eREG; and inputting the modulated modulation symbols into a subblock interleaver, and sorting so the modulation symbols in the resource groups according to the order of the modulation symbols after being output from the subblock interleaver.

In the described embodiment, the first mapping component further includes: a shifting component configured to perform cyclic shift for the sorted modulation symbols.

In the described embodiment, the second mapping component is configured to map the sorted modulation symbols to the resource elements according to one of the following manners: sequential mapping of physical resource blocks one by one, according to an order of a time domain first and then a frequency domain; and sequential mapping of physical resource blocks one by one, according to an order of the frequency domain first and then the time domain.

In the described embodiment, the second partitioning component includes: a numbering component configured to number the resource elements used for the ePDCCH according to an order of a time domain first and then a frequency domain or an order of the frequency domain first and then the time domain; and a third partitioning component configured to partition the numbered resource elements into eREGs.

In the described embodiment, the third partitioning component is configured to partition the numbered resource elements into eREGs by one of the following manners: partitioning the numbered resource elements into the eREGs at equal intervals; partitioning the numbered resource elements into the eREGs in a continuous manner according to the sequence of the numbered resource elements; inputting the numbered resource elements into a subblock interleaver, and partitioning the resource elements output from the subblock interleaver into the eREGs sequentially; and inputting the numbered resource element into the subblock interleaver, performing cyclic shift for the resource elements output from the subblock interleaver, and then partitioning resource elements subjected to the cyclic shift into the eREGs.

In the described embodiment, the first mapping component is configured to map the eREGs corresponding to the ePDCCH to different resource elements by the following manner: mapping of virtual eREGs to the eREGs, wherein the eREGs correspond to physical resources, the virtual eREGs correspond to logical units of the ePDCCH, and the virtual eREGs include continuous virtual eREGs and discrete virtual eREGs, wherein the continuous virtual eREGs are mapped to the eREGs having the same serial number as the continuous virtual eREGs, the discrete virtual eREGs are mapped to predefined eREGs.

In the described embodiment, the first mapping component is configured to map the discrete virtual eREGs to the predefined eREGs by the following manner: partitioning discrete eREGs into one or more discrete virtual eREG sets; partitioning the eREGs into one or more eREG sets; and setting the one or more discrete virtual eREG sets and the one or more eREG sets in a one-to-one correspondence, wherein the number of discrete virtual eREGs contained in each discrete virtual eREG set is equal to the number of eREGs contained in each eREG set.

In the described embodiment, the one physical resource block pair contains n eREGs, wherein the n value corresponding to the physical resource block with a normal cyclic prefix subframe is the same as the n value corresponding to the physical resource block with an extended cyclic prefix subframe; or, the one physical resource block contains n eREGs, wherein the n value is determined according to a predefined scenario, wherein the predefined scenario includes at least one of the following: extended cyclic prefix configured general subframes, normal cyclic prefix configured general subframes, an extended cyclic prefix configured special subframe set 1, an extended cyclic prefix configured special subframe set 2, a normal cyclic prefix configured special subframe set 1, and a normal cyclic prefix configured special subframe set 2, and n is an integer greater than or equal to 1.

According to yet another embodiment of the disclosure, also provided is a base station including the above-mentioned device for sending an ePDCCH.

According to still another embodiment of the disclosure, also provided is a device for receiving an ePDCCH applied to a UE, including: a determination component configured to determine resource elements to which the enhanced eREGs corresponding to the ePDCCH are mapped, wherein each of the eREGs corresponding to the ePDCCH is located in one physical resource block pair; and a receiving component configured to receive the ePDCCH on the resource elements.

According to yet another embodiment of the disclosure, also provided is a UE including the above-mentioned device for receiving an ePDCCH.

By the methods for sending and receiving an ePDCCH provided by the embodiments of the disclosure, the problem of balanced performance among the eREGs corresponding to the ePDCCH can be solved by enabling n eREGs on different physical resources blocks to correspond to different resource element positions in the physical resource blocks and discretely partitioning resource elements corresponding to the physical resource blocks into eREGs, so as to further ensure the stable ePDCCH transmission performance and also reduce the scheduling complexity and improve the resource utilization.

DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below in detail by reference to the accompanying drawings in conjunction with embodiments. It should be noted that the embodiments and the characteristics of the embodiments can be combined with each other if no conflict is caused.

Figure 1:
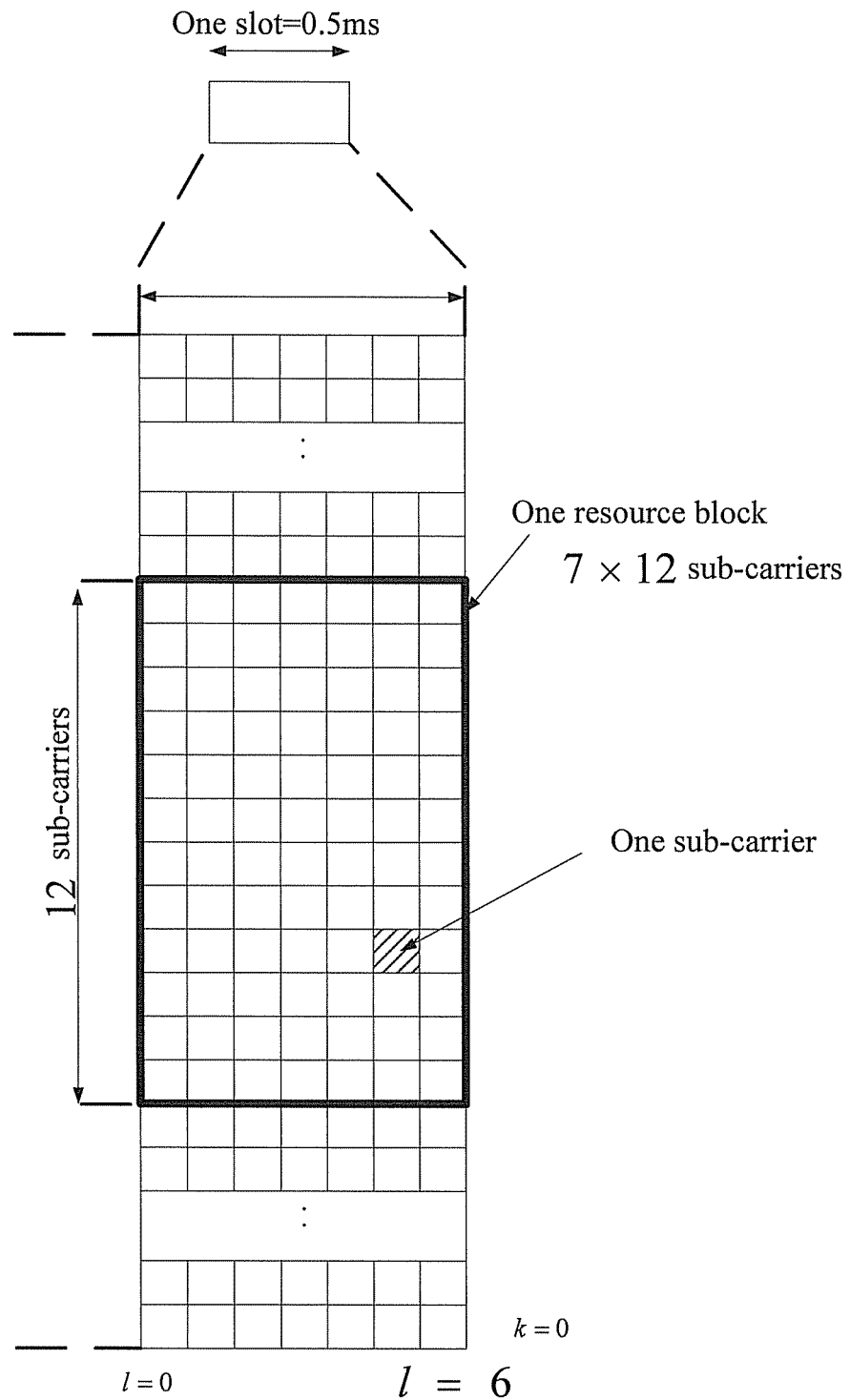
FIG. 1 shows a schematic diagram of resource block mapping when the subframe cyclic prefix is a normal cyclic prefix according to the related art.
Figures 2, 3, 4:
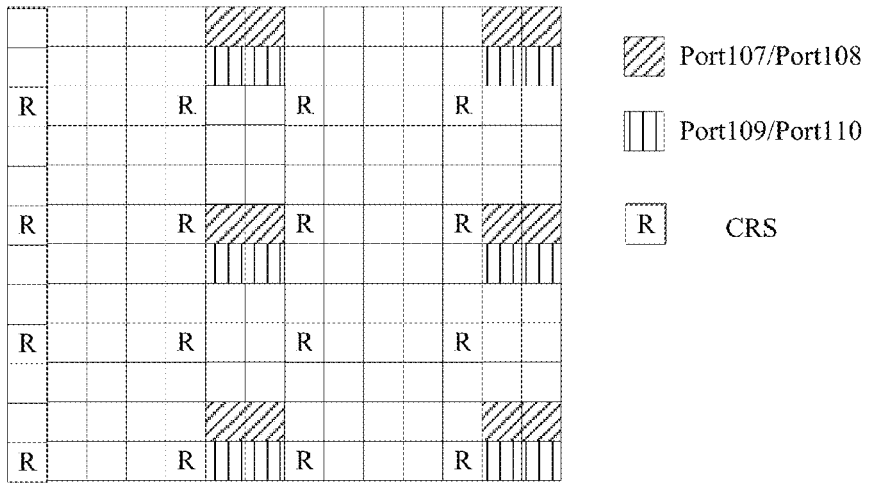
FIG. 2 shows a schematic diagram of terminal dedicated pilot frequency antenna ports 107 through 110 according to the related art.
FIG. 3 shows a flow chart of a method for sending an ePDCCH according to an embodiment of the disclosure.
FIG. 4 shows a flow chart of a method for receiving an ePDCCH according to an embodiment of the disclosure.

The example embodiment provides a method for sending an ePDCCH. FIG. 3 shows a flow chart of a method for sending an ePDCCH according to an embodiment of the disclosure. As shown in FIG. 3, the method includes steps S302 to steps S304 as follows.

Step S302: the base station maps eREGs corresponding to an ePDCCH to different resource elements, wherein each of the eREGs corresponding to the ePDCCH is located in one physical resource block pair.

Step S304: the base station sends the ePDCCH on the resource elements.

By the above-mentioned steps, the base station maps the eREGs corresponding to the ePDCCH to the different resource elements, wherein each of the eREGs corresponding to the ePDCCH is located in one physical resource pair, to achieve balanced performance among the eREGs corresponding to the ePDCCH, so as to overcome the problem of poor ePDCCH transmission performance caused by the ePDCCH processing methods in the related art, thereby improving the ePDCCH transmission performance.

As an example embodiment, one physical resource block includes n eREGs, the n eREGs on different physical resource blocks are mapped to different resource element positions in the different physical resource blocks, where n is an integer greater than or equal to 1. This example embodiment may ensure the balance of the performance among the eREGs corresponding to ePDCCH.

In specific implementation, the base station may map the eREGs corresponding to ePDCCH to different resource elements by multiple manners. Two manners are provided in this example embodiment:

manner 1: the base station partitioning the modulation symbols corresponding to the transmitted ePDCCH into resource groups, then the base station sorting the modulation symbols in the resource groups according to a predefined rule, and finally, the base station mapping the sorted modulation symbols to the resource elements; and manner 2: the base station partitioning the physical resource block pairs corresponding to the ePDCCH into eREGs, and then the base station mapping the ePDCCH to predefined eREGs.

In specific implementation, one of the above-mentioned manners may be selected as required.

In specific implementation, in the above-mentioned manner 1, the modulation symbols in the resource groups may be sorted according to one of the following predefined rules:

(1) the base station employing the order of the modulated modulation symbols;

(2) the base station sorting the modulation symbols in the resource groups according to the serial number of the eREG first and then the serial number of the modulation symbol in this eREG;

(3) the base station inputting the modulated modulation symbols into a subblock interleaver, and sorting the modulation symbols in the resource groups according to the order of the modulation symbols output from the subblock interleaver.

In specific implementation of the manner 1, before the base station mapping the sorted modulation symbols to the physical resources, the sorted modulation symbols may be subjected to cyclic shift. This example embodiment may improve the performance of modulation symbols. In an example embodiment, the base station may perform cyclic shift for the sorted modulation symbols according to at least one of the following: serial number of resource group, serial number of physical resource block corresponding to resource group, cell identity, serial number of subframe, and cyclic shift instruction signalling.

In specific implementation of the manner 1, in order to improve the mapping diversity, the base station may map the sorted modulation symbols to the resource elements according to one of the following manners:

(1) sequentially mapping the physical resource blocks one by one according to an order of the time domain first and then the frequency domain; and (2) sequentially mapping the physical resource blocks one by one according to an order of the frequency domain first and then the time domain.

In specific implementation, in the manner 2, the base station may partition the physical resource block pairs corresponding to the ePDCCH into eREGs by the following manner: the base station numbering the resource elements used for the ePDCCH according to an order of the time domain first and then the frequency domain or according to an order of the frequency domain first and then the time domain; and partitioning the numbered resource elements into eREGs.

In an example embodiment, the above-mentioned numbered resource elements may be partitioned into eREGs by one of the following manners:

manner I: partitioning the above-mentioned numbered resource elements into eREGs at equal intervals;

manner II: partitioning the above-mentioned numbered resource elements into eREGs in a continuous manner sequentially;

manner III: inputting the above-mentioned numbered resource elements into a subblock interleaver, and sequentially partitioning the resource elements output from the subblock interleaver into eREGs; and manner IV: inputting the above-mentioned numbered resource elements into a subblock interleaver, performing cyclic shift for the resource elements output from the subblock interleaver, and then partitioning the resource elements subject to the cyclic shift into eREGs.

In specific implementation, the sorted modulation symbols may be subjected to cyclic shift as required by the system according to at least one of the following: serial number of resource group, serial number of physical resource block corresponding to resource group, cell identity, serial number of subframe, and cyclic shift instruction signalling.

As an example embodiment, the initial time domain position of the physical resources corresponding to the ePDCCH may satisfy the following conditions:

an initial time domain position of physical resources corresponding to the ePDCCH is the same as an initial time domain position of a physical downlink shared channel (PDSCH) scheduled by the ePDCCH, wherein the ePDCCH and the PDSCH are in a same serving cell.

During the actual communication process, in order to improve the flexibility of the system configuration, a frequency domain position of physical resources corresponding to the ePDCCH may be a signalling configured or predefined position, wherein the predefined position includes one of the following: two sidebands of a system bandwidth, N physical resource blocks of each of the two sidebands of the system bandwidth, N physical resource blocks in a system which are mapped at intervals, and N physical resource blocks at the center of the system bandwidth, where, N is an integer greater than 0.

In specific implementation, when the downlink control information corresponding to the PDSCH of the serving cell is carried by the ePDCCH, the initial time domain position of the PDSCH of the serving cell may be determined according to the initial symbol indication signalling.

As an example embodiment, the base station encodes the ePDCCH according to physical resources with one or more predefined physical resource blocks removed, wherein the one or more predefined physical resource blocks are the same as one or more physical resource blocks where a secondary synchronization channel is located, and eREGs corresponding to the one or more predefined physical resource blocks do not carry the ePDCCH. This example embodiment improves the accuracy of the base station determining the ePDCCH physical resources.

As another example embodiment, the eREGs corresponding to the ePDCCH are mapped to different resource elements in the following manner: mapping of virtual eREGs to the eREGs, wherein the eREGs correspond to physical resources, the virtual eREGs correspond to logical units of the ePDCCH, and the virtual eREGs include continuous virtual eREGs and discrete virtual eREGs, wherein the continuous virtual eREGs are mapped to the eREGs with the same serial numbers as the continuous virtual eREGs, the discrete virtual eREGs are mapped to predefined eREGs.

In an example embodiment, in order to improve the mapping reasonability, the discrete virtual eREGs are mapped to the predefined eREGs in the following manner: partitioning discrete eREGs into one or more discrete virtual eREG sets; partitioning the eREGs into one or more eREG sets; and setting the one or more discrete virtual eREG sets and the one or more eREG sets in a one-to-one correspondence, wherein the number of discrete virtual eREGs contained in each discrete virtual eREG set is equal to the number of eREGs contained in each eREG set.

In an example embodiment, in specific implementation, the correspondences between the discrete virtual eREGs in the discrete virtual eREG set and the eREGs in the eREG set include:

when the enhanced resource element group set contains 32 resource element groups, assuming that the enhanced resource element groups in the enhanced resource element group set are numbered as a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 and the discrete virtual enhanced resource element groups in the discrete virtual enhanced resource element group set are numbered as b0, b1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and b31, and the correspondence between the discrete virtual eREGs in the discrete virtual eREG set and the eREGs in the eREG set is: a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 respectively correspond to b0, b16, b1, b17, b2, b18, b3, b19, b4, b20, b5, b21, b6, b22, b7, b23, b8, b24, b9, b25, b10, b26, b11, b27, b12, b28, b13, b29, b14, b30, b15, and b31, or a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 respectively correspond to b0, b16, b4, b20, b2, b18, b6, b22, b1, b17, b5, b21, b3, b19, b7, b23, b8, b24, b12, b28, b10, b26, b14, b30, b9, b25, b13, b29, b11, b27, b15, and b31, or a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 respectively correspond to b0, b16, b4, b20, b1, b17, b5, b21, b2, b18, b6, b22, b3, b19, b7, b23, b8, b24, b12, b28, b9, b25, b13, b29, b10, b26, b14, b30, b11, b27, b15, and b31, or a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 respectively correspond to b0, b16, b2, b18, b1, b17, b3, b19, b4, b20, b6, b22, b5, b21, b7, b23, b8, b24, b10, b26, b9, b26, b11, b27, b12, b28, b14, b30, b13, b29, b15, and b31, or a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 respectively correspond to b0, b16, b8, b24, b1, b17, b9, b25, b2, b18, b10, b26, b3, b19, b11, b27, b4, b20, b12, b28, b5, b21, b13, b29, b6, b22, b14, b30, b7, b23, b15, and b31, or a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 respectively correspond to b0, b16, b8, b24, b2, b18, b10, b26, b1, b17, b9, b25, b3, b19, b11, b27, b4, b20, b12, b28, b6, b22, b14, b30, b5, b21, b13, b29, b7, b23, b15, and b31, or a0, a1, a2, a3, a4, a5, a6, a7, a8, a9, a10, a11, a12, a13, a14, a15; a16, a11, a18, a19, a20, a21, a22, a23, a24, a25, a26, a27, a28, a29, a30, and a31 respectively correspond to b0, b16, b8, b24, b4, b20, b12, b28, b1, b17, b9, b25, b5, b21, b13, b29, b2, b18, b10, b26, b6, b22, b14, b30, b3, b19, b11, b27, b7, b23, b15, and b31;

when the eREG set contains 16 eREGs, the discrete virtual eREGs in the discrete virtual eREG set are numbered as a0, a1, a2, a3, a4, a5, a6, a7, a8, a9, a10, a11, a12, a13, a14, and a15, the eREGs in the eREG set are numbered as b0, b1, b2, b3, b4, b5, b6, b7, b8, b9, b10, b11, b12, b13, b14, and b15, and the correspondence between the discrete virtual eREGs in the discrete virtual eREG set and the eREGs in the eREG set is one of the following:

a0, a1, a2, a3, a4, a5, a6, a7, a8, a9, a10, a11, a12, a13, a14, and a15 respectively correspond to b0, b8, b1, b9, b2, b10, b3, b11, b4, b12, b5, b13, b6, b14, b7, and b15;

a0, a1, a2, a3, a4, a5, a6, a7, a8, a9, a10, a11, a12, a13, a14, and a15 respectively correspond to b0, b8, b2, b10, b1, b9, b3, b11, b4, b12, b6, b14, b5, b13, b7, and b15;

a0, a1, a2, a3, a4, a5, a6, a7, a8, a9, a10, a11, a12, a13, a14, and a15 respectively correspond to b0, b8, b4, b12, b1, b9, b5, b13, b2, b10, b6, b14, b3, b11, b7, and b15;

a0, a1, a2, a3, a4, a5, a6, a7, a8, a9, a10, a11, a12, a13, a14, and a15 respectively correspond to b0, b8, b4, b12, b2, b10, b6, b14, b1, b9, b5, b13, b3, b11, b7, and b15; and when the eREG set contains 8 eREGs, the discrete virtual eREGs in the discrete virtual eREG set are numbered as a0, a1, a2, a3, a4, a5, a6, and a7, the eREGs in the eREG set are numbered as b0, b1, a2, a3, a4, a5, a6, and b7, and the correspondence between the discrete virtual eREGs in the discrete virtual eREG set and the eREGs in the eREG set is one of the following:

a0, a1, a2, a3, a4, a5, a6, and a7 respectively correspond to b0, b4, b1, b5, b2, b6, b3, and b7; and a0, a1, a2, a3, a4, a5, a6, and a7 respectively correspond to b0, b4, b2, b6, b1, b5, b3, and b7.

In order to improve the processing accuracy, before inputting the modulation symbols or the resource elements into the subblock interleaver, also included is a step of adding Null modulation symbols, wherein the number of the added Null modulation symbols is an integer greater than or equal to 0.

As an example embodiment, one physical resource block contains n eREGs, wherein the n value corresponding to the physical resource block with a normal cyclic prefix subframe is the same as the n value corresponding to the physical resource block with an extended cyclic prefix subframe; alternatively, the one physical resource block contains n eREGs, wherein the n value is determined according to a predefined scenario, wherein the predefined scenario includes at least one of the following: extended cyclic prefix configured general subframes, normal cyclic prefix configured general subframes, an extended cyclic prefix configured special subframe set 1, an extended cyclic prefix configured special subframe set 2, a normal cyclic prefix configured special subframe set 1, and a normal cyclic prefix configured special subframe set 2, and n is an integer greater than or equal to 1.

In an example embodiment, the normal cyclic prefix configured special subframe set 1 includes special subframe configurations 3, 4 and 8; or the normal cyclic prefix configured special subframe set 1 includes special subframe configurations 1, 2, 6, 7, 3, 4, and 8;

the normal cyclic prefix configured special subframe set 2 includes special subframe configurations 1, 2, 6, and 7;

the extended cyclic prefix configured special subframe set 1 includes special subframe configurations 1, 2, 3, 5, and 6; or the extended cyclic prefix configured special subframe set 1 includes special subframe configurations 1, 2, 3, 4, 5, and 6; and the extended cyclic prefix configured special subframe set 2 includes a special 20, subframe configuration 4.

Another example embodiment provides a method for receiving an ePDCCH. FIG. 4 shows a flow chart of a method for receiving an ePDCCH according to an embodiment of the disclosure. As shown in FIG. 4, the method includes steps S402 to steps S404 as follows.

Step S402: the UE determines resource elements to which the eREGs corresponding to an ePDCCH are mapped, wherein each of the eREGs corresponding to the ePDCCH is located in one physical resource block pair.

Step S404: the UE receives the ePDCCH on the resource elements.

By the above-mentioned steps, the UE determines the resource elements to which the eREGs corresponding to the ePDCCH are mapped, wherein each of the eREGs corresponding to the ePDCCH is located in one physical resource pair, to achieve balanced performance among the eREGs corresponding to the ePDCCH, so as to overcome the problem of poor ePDCCH transmission performance caused by the ePDCCH processing methods in the related art, thereby improving the ePDCCH transmission performance.

As an example embodiment, one physical resource block includes n eREGs, the n eREGs on different physical resource blocks are mapped to different resource element positions in the different physical resource blocks, where n is an integer greater than or equal to 1. This example embodiment may ensure the balance of the performance among the eREGs corresponding to ePDCCH.

It should be noted that the steps shown in the flowchart of the drawings can be executed, for example, in a computer system with a set of instructions executable by a computer, in addition, a logic order is shown in the flowchart, but the shown or described steps can be executed in a different order under some conditions.

In another embodiment, also provided is an ePDCCH sending device software for executing the technical solution described in the above-mentioned embodiments and the example embodiments.

In another embodiment, also provided is a storage medium storing the above-mentioned ePDCCH sending software, the storage medium including but not limited to: optical disk, floppy disk, hard disk, erasable memory, etc.

One embodiment of the disclosure also provides a device for sending an ePDCCH applied to a base station. The ePDCCH sending device may be used for implementing the above-mentioned ePDCCH sending method and the example embodiments, which has been described and will not be explained here. The components in the ePDCCH sending device are described below in detail. As used below, the term "component" is a combination of software and/or hardware capable of implementing predetermined functions. Although the system and method described in the following embodiment may be preferably implemented by software, it would be conceived to implement hardware or a combination of software and hardware.

Figure 5:
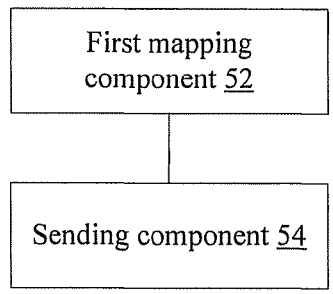
FIG. 5 shows a structure diagram of a device for sending an ePDCCH according to an embodiment of the disclosure.

FIG. 5 shows a structure diagram of a device for sending an ePDCCH according to an embodiment of the disclosure. As shown in FIG. 5, the device includes a first mapping component 52 and a sending component 54. The above-mentioned structure is described below in detail.

The first mapping component 52 is configured to map enhanced resource element groups (eREGs) corresponding to an ePDCCH to different resource elements, wherein each of the eREGs corresponding to the ePDCCH is located in one physical resource block pair; and the sending component 54 is coupled to the first mapping component 52 and configured to send the ePDCCH on the resource elements to which the first mapping component 52 maps.

In an example embodiment, one physical resource block includes n eREGs, the n eREGs on different physical resource blocks are mapped to different resource element positions in the different physical resource blocks, where n is an integer greater than or equal to 1.

Figure 6:
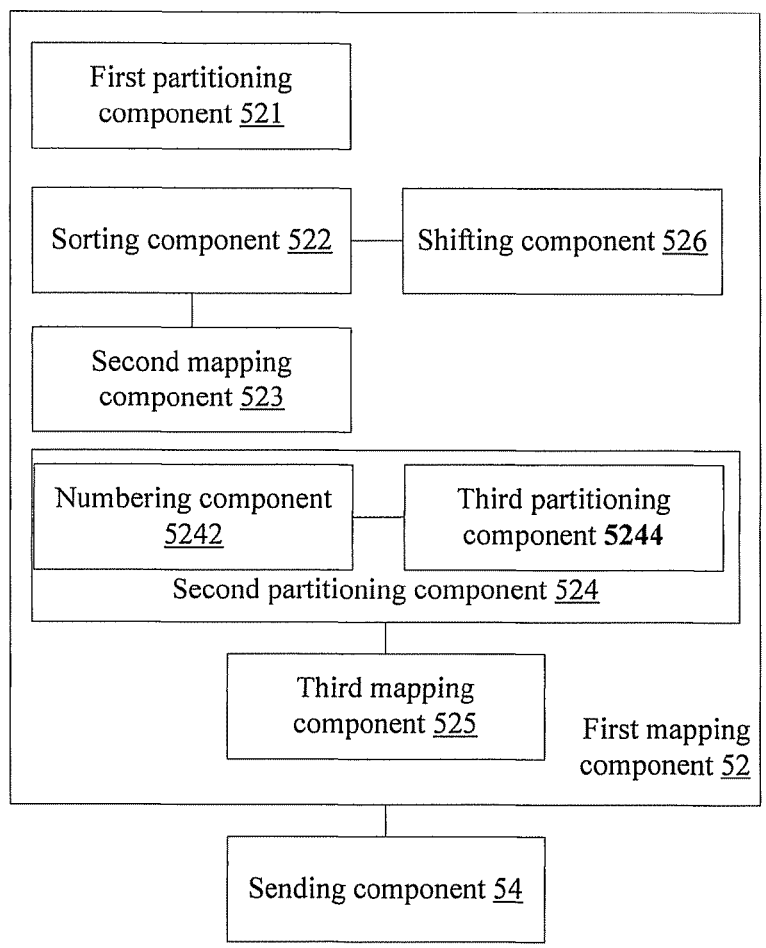
FIG. 6 shows an example structure diagram of a device for sending an ePDCCH according to an embodiment of the disclosure.

FIG. 6 shows an example structure diagram of a device for sending an ePDCCH according to an embodiment of the disclosure. As shown in FIG. 6, the first mapping component 52 includes a first partitioning component 521, a sorting component 522, a second mapping component 523, a second partitioning component 524, and a third mapping component 525; the first mapping component 52 also includes a shifting component 526; and the second partitioning component 524 includes a numbering component 5242 and a third partitioning component 5244. The above-mentioned structure is described below in detail.

The first mapping component 52 includes:

a first partitioning component 521 configured to partition the modulation symbols corresponding to a transmitted ePDCCH into resource groups; a sorting component 522 coupled to the first partitioning component 521 and configured to sort the modulation symbols in the resource groups partitioned by the first partitioning component 521 according to a predefined rule; and a second mapping component 523 coupled to the sorting component 522 and configured to map the modulation symbols sorted by the sorting component 522 to resource elements; or a second partitioning component 524 configured to partition the physical resource block pairs corresponding to the ePDCCH into eREGs; and a third mapping component 525 coupled to the second partitioning component 524 and configured to map the ePDCCH to the eREGs partitioned by the second partitioning component 524.

In an example embodiment, the sorting component 522 is configured to sort the modulation symbols in the resource groups by one of the following manners:

employing the order of the modulated modulation symbols;

sorting the modulation symbols in the resource groups according to the serial numbers of eREGs first and then the serial numbers of the modulation symbols in the eREGs; and inputting the modulated modulation symbols into a subblock interleaver, and sorting the modulation symbols in the resource groups according to the order of the modulation symbols output from the subblock interleaver.

The first mapping component 52 also includes a shifting component 526 configured to perform cyclic shift for the sorted modulation symbols.

In an example embodiment, the second mapping component 523 is configured to map the sorted modulation symbols to the resource elements by one of the following manners:

sequentially mapping the physical resource blocks one by one according to an order of the time domain first and then the frequency domain; and sequentially mapping the physical resource blocks one by one according to an order of the frequency domain first and then the time domain.

In an example embodiment, the second partitioning component 524 includes a numbering component 5242 configured to number the resource elements used for the ePDCCH according to an order of the frequency domain first and then the time domain or according to an order of the time domain first and then the frequency domain; and a third partitioning component 5244 coupled to the numbering component 5242 and configured to partition the resource elements numbered by the numbering component 5242 into eREGs.

In an example embodiment, the third partitioning component 5244 is configured to partition the numbered resource elements into eREGs by one of the following manners:

partitioning the numbered resource elements into the eREGs at equal intervals;

partitioning the numbered resource elements into the eREGs in a continuous manner according to the sequence of the numbered resource elements;

inputting the numbered resource elements into a subblock interleaver, and sequentially partitioning the resource elements output from the subblock interleaver into the eREGs; and inputting the numbered resource elements into the subblock interleaver, performing cyclic shift for the resource elements output from the subblock interleaver, and then partitioning resource elements subjected to the cyclic shift into the eREGs.

In another embodiment, also provided is an ePDCCH receiving device software for executing the technical solution described in the above-mentioned embodiments and the example embodiments.

In another embodiment, also provided is a storage medium storing the above-mentioned ePDCCH receiving software, the storage medium including but not limited to: optical disk, floppy disk, hard disk, erasable memory, etc.

One embodiment of the disclosure also provides a device for receiving an ePDCCH applied to a UE. The ePDCCH receiving device may be used for implementing the above-mentioned ePDCCH receiving method and the example embodiments, which has been described and will not be explained here. The components in the ePDCCH receiving device are described below in detail. As used below, the term "component" is a combination of software and/or hardware capable of implementing predetermined functions. Although the system and method described in the following embodiment may be preferably implemented by software, it would be conceived to implement hardware or a combination of software and hardware.

Figure 7:
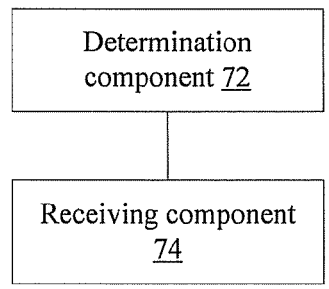
FIG. 7 shows a structure diagram of a device for receiving an ePDCCH according to an embodiment of the disclosure.

FIG. 7 shows a structure diagram of a device for receiving an ePDCCH according to an embodiment of the disclosure. As shown in FIG. 7, the device includes a determination component 72 and a receiving component 74. The above-mentioned structure is described below in detail.

The determination component 72 is configured to determine resource elements to which eREGs corresponding to an ePDCCH are mapped, wherein each of the eREGs corresponding to the ePDCCH is located in one physical resource block pair; and a receiving component 74 coupled to the determination component 72 and configured to receive the ePDCCH on the resource elements determined by the determination component 72.

Figure 8:
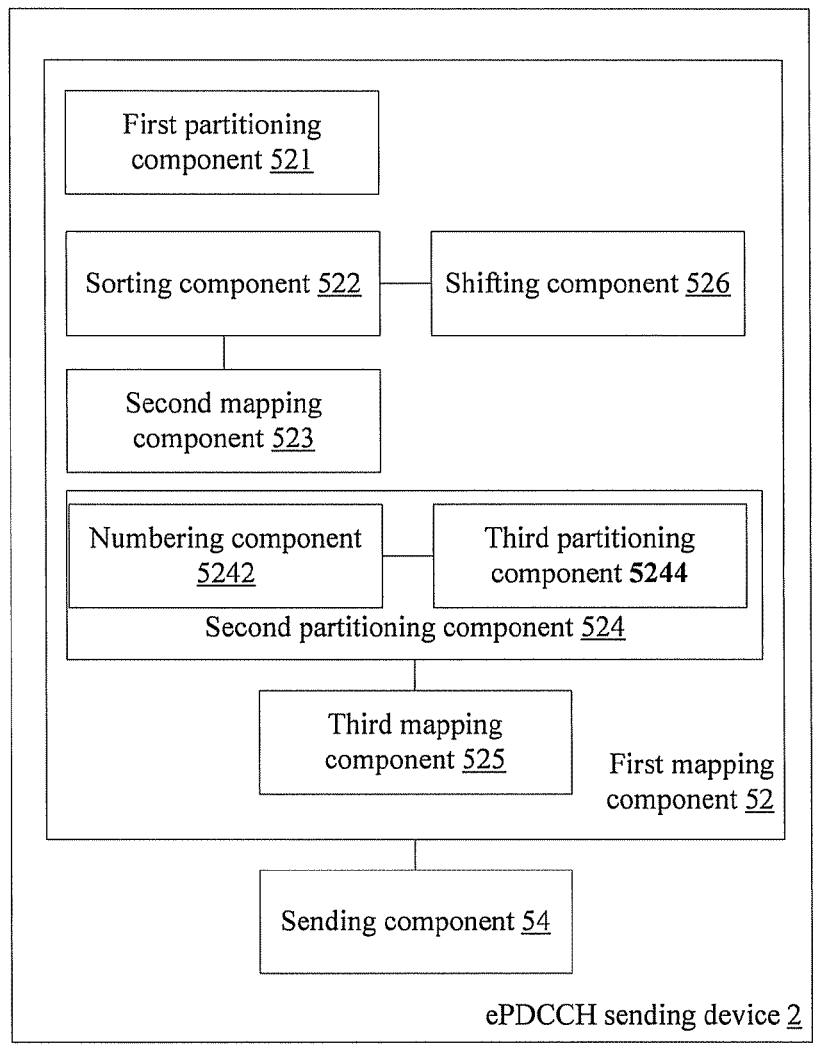
FIG. 8 shows a structure diagram of a base station according to an embodiment of the disclosure.

This example embodiment also provides a base station. FIG. 8 shows a structure diagram of a base station according to an embodiment of the disclosure. As shown in FIG. 8, the base station includes an ePDCCH sending device shown in FIG. 5 or 6. The device includes a first mapping component 52 and a sending component 54, the first mapping component 52 including a first partitioning component 521, a sorting component 522, a second mapping component 523, a second partitioning component 524 and a third mapping component 525, the first mapping component 52 also including a shifting component 526; and the second partitioning component 524 including a numbering component 5242 and a third partitioning component 5244. The above-mentioned structure is described below in detail.

The first mapping component 52 is configured to map enhanced resource element groups (eREGs) corresponding to an ePDCCH to different resource elements, wherein each of the eREGs corresponding to the ePDCCH is located in one physical resource block pair; and the sending component 54 is coupled to the first mapping component 52 and configured to send the ePDCCH on the resource elements to which the first mapping component 52 maps.

In an example embodiment, one physical resource block includes n eREGs, the n eREGs on different physical resource blocks are mapped to different resource element positions in the different physical resource blocks, where n is an integer greater than or equal to 1.

The first mapping component 52 includes:

a first partitioning component 521 configured to partition the modulation, symbols corresponding to a transmitted ePDCCH into resource groups; a sorting component 522 coupled to the first partitioning component 521 and configured to sort the modulation symbols in the resource groups partitioned by the first partitioning component 521 according to a predefined rule; and a second mapping component 523 coupled to the sorting component 522 and configured to map the modulation symbols sorted by the sorting component 522 to resource elements; or a second partitioning component 524 configured to partition the physical resource block pairs corresponding to the ePDCCH into eREGs; and a third mapping component 525 coupled to the second partitioning component 524 and configured to map the ePDCCH to the eREGs partitioned by the second partitioning component 524.

The first mapping component 52 also includes a shifting component 526 configured to perform cyclic shift for the sorted modulation symbols.

In an example embodiment, the second partitioning component 524 includes a numbering component 5242 configured to number the resource elements used for the ePDCCH according to an order of the frequency domain first and then the time domain or according to an order of the time domain first and then the frequency domain; and a third partitioning component 5244 coupled to the numbering component 5242 and configured to partition the resource elements numbered by the numbering component 5242 into eREGs.

Figure 9:
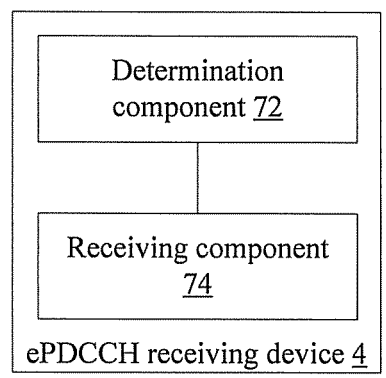
FIG. 9 shows a structure diagram of user equipment according to an embodiment of the disclosure.

This example embodiment provides a UE. FIG. 9 shows a structure diagram of user equipment according to an embodiment of the disclosure. As shown in FIG. 9, the base station includes the device 4 for receiving the ePDCCH shown in FIG. 7, the device including a determination component 72 and a receiving component 74. The structure above is described below in detail.

The determination component 72 is configured to determine the resource elements to which the eREGs corresponding to an ePDCCH are mapped, wherein each of the eREGs corresponding to the ePDCCH is located in one physical resource block pair; and a receiving component 74 coupled to the determination component 72 and configured to receive the ePDCCH on the resource elements determined by the determination component 72.

The technical solutions of the embodiments of the disclosure will be described below in detail in conjunction with example embodiments which may combine the above-mentioned embodiments and example implementations.

Example Embodiment I

This example embodiment provides a method for sending an ePDCCH, including the following steps.

Step 1: modulated symbols are partitioned into resource groups.

In this step, modulated symbols corresponding to every n eREGs are partitioned into one resource group according to the serial numbers of eREGs, different resource groups containing different eREGs, where n is the number of the eREGs corresponding to one or more corresponding physical resource block pairs. Alternatively, the modulated symbols are partitioned into resource groups with predefined parameter X as a unit, different resource groups containing different modulation symbols, where the X values corresponding to different resource groups may be the same or different values.

The X value is the number of sub-carriers corresponding to one or more corresponding physical resource blocks.

After partitioning the modulated symbols into the resource groups, also included is a step of adding one or more Null modulation symbols to the resource groups, wherein the number of the added Null modulation symbols is an integer greater than or equal to 0, and the number of the resource groups added with Null modulation symbols is equal to the number of the resource elements on one or more corresponding physical resource blocks.

When the number of the added Null modulation symbols in all resource groups is fixed to 0, it is equivalent to that this step does not exist.

The Null modulation symbols added to respective resource groups may be the same or different.

In an example embodiment, one physical resource block contains n eREGs, the n value corresponding to the normal cyclic prefix subframe being the same as that of the extended cyclic prefix subframe. Alternatively, one physical resource block contains n eREGs, the n value being determined according to a predefined scenario, wherein the predefined scenario includes at least one of the following: extended cyclic prefix configured general subframes, normal cyclic prefix configured general subframes, an extended cyclic prefix configured special subframe set 1, an extended cyclic prefix configured special subframe set 2, a normal cyclic prefix configured special subframe set 1, and normal cyclic prefix configured special subframe set 2.

In an example embodiment, the normal cyclic prefix configured special subframe set 1 includes special subframe configurations 3, 4 and 8; or the normal cyclic prefix configured special subframe set 1 includes special subframe configurations 1, 2, 6, 7, 3, 4, and 8;

the normal cyclic prefix configured special subframe set 2 includes special subframe configurations 1, 2, 6, and 7;

the extended cyclic prefix configured special subframe set 1 includes special subframe configurations 1, 2, 3, 5, and 6; or the extended cyclic prefix configured special subframe set 1 includes special subframe configurations 1, 2, 3, 4, 5, and 6;

the extended cyclic prefix configured special subframe set 2 includes a special subframe configuration 4.

The determination of the value of n under different scenarios will be described below in conjunction with multiple examples.

Example 1: the value of n of the normal cyclic prefix subframe is equal to that of the extended cyclic prefix subframe, n being 8.

Example 2: when the subframe is an extended cyclic prefix configured general subframe, n is 4; when the subframe is a normal cyclic prefix configured general subframe, n is 8; and when the subframe is a special subframe set 1, n is 4; when the subframe is a special subframe set 2, n is 2. In this example, the special subframe set 1 includes special subframe configurations 3, 4 and 8 in which the downlink subframe employ a normal cyclic prefix configuration, and a special subframe configuration 4 in which the downlink subframe employs an extended cyclic prefix configuration; and the special subframe set 2 includes special subframe configurations 1, 2, 6 and 7 in which the downlink subframe employs a normal cyclic prefix configuration, and special subframe configurations 1, 2, 3, 5, and 6 in which the downlink subframe employs an extended cyclic prefix configuration.

Example 3: when the subframe is a normal cyclic prefix configured general subframe, n is 8; and when the subframe is a special subframe and an extended cyclic prefix 5 configured general subframe, n is 4.

Example 4: when the subframe is an extended cyclic prefix configured general subframe, n is 4; when the subframe is a normal cyclic prefix configured general subframe, n is 8; when the subframe is a special subframe set 1, n is 4; and when the subframe is a special subframe set 2, n is 2. In this example, the special subframe set 1 includes special subframe configurations 2, 6, 7, 3, 4 and 8 in which the downlink subframe employs a normal cyclic prefix configuration, and special subframe configurations 2, 3, 4 and 6 in which the downlink subframe employs an extended cyclic prefix configuration; the special subframe set 2 includes, special subframe configurations 1 and 6 in which the downlink subframe employs a normal cyclic prefix configuration, and special subframe configurations 1 and 5 in which the downlink subframe employs an extended cyclic prefix configuration.

The above-mentioned classification does not include the definition of scenarios under new carrier types.

Step 2: symbols in the resource groups are sorted.

The following manners may be employed for sorting in this step:

manner 1: keeping the existing order of the modulated symbols unchanged;

manner 2: respectively numbering the modulated symbols corresponding to respective eREGs, so that each modulated symbol corresponds to the serial number of one eREG and the serial number of this modulated symbol in this eREG, and then resorting is performed according to the serial number of the eREG first and then the serial number of this modulated symbol in this eREG; and manner 3: inputting all modulated symbols into a sub-block interleaver, and sorting according to the order after being output from the subblock interleaver.

After the above-mentioned sorting, the sorted symbols of respective resource groups may be cyclic shifted, or the sorted symbols of respective resource groups may be directly output without cyclic shift.

In an example embodiment, the sorted symbols of respective resource groups may be cyclic shifted according to the following manner: the sorted symbols of respective resource groups may be cyclic shifted according to at least one of: the serial number of the resource group, the serial number of the physical resource block corresponding to the resource group, cell identity, the serial number of subframe, and cyclic shift instruction signalling.

For example, the cyclic shift may be performed according to the serial number of the physical resource block corresponding to the resource group, or the cyclic shift may be performed according to both the serial number of the physical resource block corresponding to the resource group and the serial number of subframe, or the cyclic shift may be performed according to both the serial number of the physical resource block corresponding to the resource group and the cyclic shift instruction signalling; or the cyclic shift may be performed according to the block serial number of the physical resource corresponding to the resource group, the serial number of subframe, and the cell identity.

Step 3: the sorted symbols are mapped to physical resources.

In this step, mapping may be performed for physical resource block pairs one by one according to the time domain first and then the frequency domain, or according to the frequency domain first and then the time domain.

In specific implementation, mapping is performed for physical resource blocks one by one according to the serial number of physical resource block, and when mapping within one physical resource block, mapping is performed according to the order (e.g., the time domain first and then the frequency domain, or the frequency domain first and then the time domain).

In an example embodiment, the initial time domain position of the physical resources corresponding to the ePDCCH is relevant to the initial time domain position of the PDSCH on a serving cell where the ePDCCH is located.

For example, the initial time domain position of the physical resource corresponding an ePDCCH is the same as the initial time domain position of the physical downlink shared channel (PDSCH) scheduled by the ePDCCH, the ePDCCH and the PDSCH being in the same serving cell; and when the downlink control information corresponding to the PDSCH of the serving cell is carried by the ePDCCH, the initial time domain position of the PDSCH of the serving cell is determined according to an initial symbol indication signalling.

In specific implementation, the initial symbol indication signalling includes an indication on whether the initial time domain position of PDSCH/ePDCCH of the serving cell is determined according to PCFICH, if not, the initial symbol indication signalling provides the initial time domain position of PDSCH/ePDCCH of the serving cell. If a UE does not receive the initial symbol indication signalling, the initial time domain position of PDSCH/ePDCCH of the serving cell may be obtained according to the PCFICH.

Alternatively, in specific implementation, the initial symbol indication signalling includes the initial time domain position of PDSCH/ePDCCH of the serving cell. Here, the PDSCH is scheduled by the ePDCCH.

The frequency domain position of the frequency domain ePDCCH is configured by signalling or is a predefined position including fixed N physical resource blocks of center frequency band, or two system bandwidth sidebands each having N physical resource blocks, or N physical resource blocks mapped to the system bandwidth at intervals, or N physical resource blocks at the center of the system bandwidth.

When the physical resource block is the same as the physical resource block where the secondary synchronization channel is located, the eREGs corresponding to the physical resource block are not used for transmitting the ePDCCH, and a sending terminal encodes the ePDCCH according to the physical resources with these physical resource blocks removed.

Example Embodiment II

This example embodiment provides a method for sending an ePDCCH. In this embodiment, Y bits after encoding the ePDCCH are multiplexed together. The eREGs corresponding to the ePDCCH are determined specifically by mapping virtual eREGs to eREGs, wherein the eREGs correspond to specific physical resources, the virtual eREGs correspond to logical units of the ePDCCH, the logical unit is configured for allocating resources for the ePDCCH or configured for carrying bit information after encoding the ePDCCH. The bits after encoding the ePDCCH are mapped to corresponding virtual eREGs; and then the virtual eREGs corresponding to the ePDCCH are mapped to the eREGs. The value of Y is a positive integer greater than 1, and Y may be the number of all ePDCCHs to be transmitted by the current serving cell in the current subframe, or a value less than the number of all ePDCCHs to be transmitted by the current serving cell in the current subframe.

Here, the virtual eREGs include continuous virtual eREGs and discrete virtual eREGs, wherein the continuous virtual eREGs are directly mapped to the eREGs having the same serial number as the virtual eREGs;

the discrete virtual eREGs are directly mapped to predefined eREGs.

In an example embodiment, a predefined mapping relation is determined as follows:

partitioning the discrete virtual eREGs into discrete virtual eREG sets, wherein different discrete virtual eREG sets contain different discrete virtual eREGs, e.g., a sequential partitioning manner is employed;

partitioning the eREGs into eREG sets, wherein different eREG sets contain different eREGs, e.g., a sequential partitioning manner or a manner of extracting at intervals is employed;

arranging one-to-one correspondence between the discrete virtual eREG sets and the eREG sets, e.g., a discrete virtual eREG set #k is set to be corresponding to an eREG set #k;

wherein the number of discrete virtual eREGs contained in the discrete virtual eREG set is equal to the number of eREGs contained in the eREG set;

when the eREG set contains 32 eREGs, assuming that the eREGs in the eREG set are numbered as a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 and the discrete virtual eREGs in the discrete virtual eREG set are numbered as b0, b1, b2, b3, b4, b5, b6, b7, b8, b9, b10, b11, b12, b13, b14, b15, b16, b17, b18, b19, b20, b21, b22, b23, b24, b25, b26, b27, b28, b29, b30, and b31, and the correspondence between the discrete virtual eREGs in the discrete virtual eREG set and the eREGs in the eREG set is: a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, a31 correspond to b0, b16, b1, b17, b2, b18, b3, b19, b4, b20, b5, b21, b6, b22, b7, b23, b8, b24, b9, b25, b10, b26, b11, b27, b12, b28, b13, b29, b14, b30, b15, b31; or a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, a31 correspond to b0, b16, b4, b20, b2, b18, b6, b22, b1, b17, b5, b21, b3, b19, b7, b23, b8, b24, b12, b28, b10, b26, b14, b30, b9, b25, b13, b29, b11, b27, b15, b31; or a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, a31 respectively correspond to b0, b16, b4, b20, b1, b17, b5, b21, b2, b18, b6, b22, b3, b19, b7, b23, b8, b24, b12, b28, b9, b25, b13, b29, b10, b26, b14, b30, b11, b27, b15, b31; or a0, a1, . . . , a31 respectively correspond to b0, b16, b2, b18, b1, b17, b3, b19, b4, b20, b6, b22, b5, b21, b7, b23, b8, b24, b10, b26, b9, b26, b22, b27, b12, b28, b14, b30, b13, b29, b15, b31; or a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, a31 respectively correspond to b0, b16, b8, b24, b1, b17, b9, b25, b2, b18, b10, b26, b3, b19, b11, b27, b4, b20, b12, b28, b5, b21, b13, b29, b6, b22, b14, b30, b7, b23, b15, b31; or a0, a1, . . . , a31 respectively correspond to b0, b16, b8, b24, b2, b18, b10, b26, b1, b17, b9, b25, b3, b19; b11, b27, b4, b20, b12, b28, b6, b22, b14, b30, b5, b21, b13, b29, b7, b23, b15, b31; or a0, a1, . . . , a31 respectively correspond to b0, b16, b8, b24, b4, b20, b12, b28, b1, b17, b9, b25, b5, b21, b13, b29, b2, b18, b10, b26, b6, b22, b14, b30, b3, b19, b11, b27, b7, b23, b15, b31;

when the eREG set contains 16 eREGs, assuming that the discrete virtual eREGs in the discrete virtual eREG set are numbered as a0, a1, . . . , a15 and the eREGs in the eREG set are numbered as b0, b1, . . . , b15, the correspondence between the discrete virtual eREGs in the discrete virtual eREG set and the eREGs in the eREG set is: a0, a1, . . . , a15 correspond to b0, b8, b1, b9, b2, b10, b3, b11, b4, b12, b5, b13, b6, b14, b7, b15; or a0, a1, a2, a3, a4, a5, a6, a7, a8, a9, a10, a11, a12, a13, a14, a15 correspond to b0, b8, b2, b10, b1, b9, b3, b11, b4, b12, b6, b14, b5, b13, b7, b15; or a0, a1, a2, a3, a4, a5, a6, a7, a8, a9, a10, a11, a12, a13, a14, a15 correspond to b0, b8, b4, b12, b1, b9, b5, b13, b2, b10, b6, b14, b3, b11, b7, b15; or a0, a1, a2, a3, a4, a5, a6, a7, a8, a9, a10, a11, a12, a13, a14, a15 correspond to b0, b8, b4, b12, b2, b10, b6, b14, b1, b9, b5, b13, b3, b11, b7, b15;

when the eREG set contains 8 eREGs, assuming that the discrete virtual eREGs in the discrete virtual eREG set are numbered as a0, a1, a2, a3, a4, a5, a6, and a7 and the eREGs in the eREG set are numbered as b0, b1, . . . , and b7, the correspondence between the discrete virtual eREGs in the discrete virtual eREG set and the eREGs in the eREG set is: a0, a1, a2, a3, a4, a5, a6, a7 correspond to b0, b4, b1, b5, b2, b6, b3, b7; or a0, a1, a2, a3, a4, a5, a6, a7 correspond to b0, b4, b2, b6, b1, b5, b3, b7.

The above technical solution will be described below in conjunction with multiple examples.

Example 1

When the base station configures 8 physical resource block pairs for transmitting an ePDCCH, one physical resource block pair including 8 eREGs, with 64 eREGs in total, the eREG set may contain 32 eREGs, i.e., all eREGs are partitioned into 2 eREG sets, or the eREG set may contain 16 eREGs, i.e., all eREGs are partitioned into 4 eREG sets, or the eREG set may contain 8 eREGs, i.e., all eREGs are partitioned into 8 eREG sets.

Example 2

When the base station configures 4 physical resource block pairs for transmitting an ePDCCH, one physical resource block pair including 8 eREGs, with 32 eREGs in total, the eREG set may contain 32 eREGs, i.e., all eREGs are partitioned into 1 eREG sets, or the eREG set may contain 16 eREGs, i.e., all eREGs are partitioned into 2 eREG sets, or the eREG set may contain 8 eREGs, i.e., all eREGs are partitioned into 4 eREG sets.

Example 3

When the base station configures 8 physical resource block pairs for transmitting an ePDCCH, one physical resource block pair including 4 eREGs, with 32 eREGs in total, the eREG set may contain 32 eREGs, i.e., all eREGs are partitioned into 1 eREG sets, or the eREG set may contain 16 eREGs, i.e., all eREGs are partitioned into 2 eREG sets, or the eREG set may contain 8 eREGs, i.e., all eREGs are partitioned into 4 eREG sets.

Example 4

When the base station configures 4 physical resource block pairs for transmitting an ePDCCH, one physical resource block pair including 4 eREGs, with 16 eREGs in total, the eREG set may contain 16 eREGs, i.e., all eREGs are partitioned into 1 eREG sets, or the eREG set may contain 8 eREGs, i.e., all eREGs are partitioned into 2 eREG sets.

Example 5

When the base station configures 8 physical resource block pairs for transmitting an ePDCCH, one physical resource block pair including 2 eREGs, with 16 eREGs in total, the eREG set may contain 16 eREGs, i.e., all eREGs are partitioned into 1 eREG sets, or the eREG set may contain 8 eREGs, i.e., all eREGs are partitioned into 2 eREG sets.

This example embodiment includes steps as follows.

Step 1: the modulated symbols are partitioned into resource groups.

In the step, modulated symbols corresponding to every n eREGs are partitioned into one resource group according to the serial numbers of eREGs, different resource groups containing different eREGs, wherein n is the number of eREGs corresponding to one or more corresponding physical resource block pairs.

After partitioning the modulated symbols into the resource groups, also included is a step of adding Null modulation symbols to the resource groups, wherein the number of the added Null modulation symbols is an integer greater than or equal to 0, and the number of the resource groups added with Null modulation symbols is equal to the number of the resource elements on one or more corresponding physical resource blocks.

When the number of the added Null modulation symbols in all resource groups is fixed to 0, it is equivalent to that this step does not exist.

In an example embodiment, the Null modulation symbols added to respective resource groups may be the same or different.

The n value corresponding to the normal cyclic prefix subframe is the same as that of the extended cyclic prefix subframe, or the n value is determined according to a predefined scenario including at least one of the following: extended cyclic prefix configured general subframes, normal cyclic prefix configured general subframes, an extended cyclic prefix configured special subframe set 1, an extended cyclic prefix configured special subframe set 2, a normal cyclic prefix configured special subframe set 1, and normal cyclic prefix configured special subframe set 2.

For example, the n value for the extended cyclic prefix configured general subframe is 2, the n value for the normal cyclic prefix configured general subframe is 4, the n value for the extended cyclic prefix configured special subframe set 1 is 1, the n value for the extended cyclic prefix configured special subframe set 2 is 2, the n value for the normal cyclic prefix configured special subframe set 1 is 2, and the n value for the normal cyclic prefix configured special subframe set 2 is 1; alternatively, the n value for the extended cyclic prefix configured general subframe is 2, the n value for the normal cyclic prefix configured general subframe is 4, the n value for the extended cyclic prefix configured special subframe set 1 is 1, the n value for the normal cyclic prefix configured special subframe set 1 is 2, and the n value for normal cyclic prefix configured special subframe set 2 is 1.

In an example embodiment, the normal cyclic prefix configured special subframe set 1 includes special subframe configurations 3, 4 and 8; or the normal cyclic prefix configured special subframe set 1 includes special subframe configurations 1, 2, 6, 7, 3, 4, and 8;

the normal cyclic prefix configured special subframe set 2 includes special subframe configurations 1, 2, 6, and 7;

the extended cyclic prefix configured special subframe set 1 includes special subframe configurations 1, 2, 3, 5, and 6; or, the extended cyclic prefix configured special subframe set 1 includes special subframe configurations 1, 2, 3, 4, 5, and 6;

the extended cyclic prefix configured special subframe set 2 includes a special subframe configuration 4.

Step 2: symbols in the resource groups are sorted.

The following manners may be employed for sorting in this step:

Manner 1: keeping the existing order of the modulated symbols unchanged.

Manner 2: respectively numbering the modulated symbols corresponding to respective eREGs, so that each modulated symbol corresponds to the serial number of one eREG and the serial number of this modulated symbol in one eREG, and then resorting is performed according to the serial number of the eREG first and then the serial number of this modulated symbol in this eREG;

it should be noted that if eREG #0 includes symbols c0, c1, c2, and c3, with respective serial numbers of 0, 1, 2, and 3, and the eREG #1 includes symbols d0, d1, d2, and d3, with respective serial numbers of 0, 1, 2, and 3, the sorting result after numbering according to the manner 2 is c0, d0, c1, d1, c2, d2, c3, and d3;

Manner 3: inputting all modulated symbols into a subblock interleaver, and sorting according to the order output from the subblock interleaver, in this manner, the subblock interleaver may be the subblock interleaver defined according to TS36.212-V910 version standard, chapter 5.1.4.2.1.

After the above-mentioned sorting, the sorted symbols of respective resource groups may be cyclic shifted, or the sorted symbols of respective resource groups may be directly output without cyclic shift.

In an example embodiment, the sorted symbols of respective resource groups may be cyclic shifted according to the following manner: the sorted symbols of respective resource groups may be cyclic shifted according to at least one of: the serial number of the resource group, the serial number of the physical resource block corresponding to the resource group, cell identity, the serial number of subframe, and cyclic shift instruction signalling.

For example, the cyclic shift may be performed according to the serial number of the physical resource block corresponding to the resource group, or the cyclic shift may be performed according to both the serial number of the physical resource block corresponding to the resource group and the serial number of subframe, or the cyclic shift may be performed according to both the serial number of the physical resource block corresponding to the resource group and the cyclic shift instruction signalling; or the cyclic shift may be performed according to the block serial number of the physical resource corresponding to the resource group, the serial number of subframe, and the cell identity.

Step 3: the sorted symbols are mapped to physical resources.

Mapping may be performed for physical resource block pairs one by one according to the time domain first and then the frequency domain, or according to the frequency domain first and then the time domain.

In specific implementation, mapping may be performed for physical resource blocks one by one according to the serial number of physical resource block, and when mapping within one physical resource block, mapping is performed according to the order (e.g., the time domain first and then the frequency domain, or the frequency domain first and then the time domain).

In an example embodiment, the initial time domain position of the physical resource corresponding to the ePDCCH is relevant to the initial time domain position of the PDSCH on a serving cell where the ePDCCH is located, it will be described below in detail.

The initial time domain position of physical resources corresponding to the ePDCCH is the same as the initial time domain position of a physical downlink shared channel (PDSCH) scheduled by the ePDCCH, wherein the ePDCCH and the PDSCH are in a same serving cell; and when the downlink control information corresponding to the PDSCH of the serving cell is carried by the ePDCCH, the initial time domain position of the PDSCH of the serving cell is determined according to an initial symbol indication signalling.

In specific implementation, the initial symbol indication signalling includes an indication on whether the initial time domain position of PDSCH/ePDCCH of the serving cell is determined according to PCFICH, if not, the initial symbol indication signalling provides the initial time domain position of PDSCH/ePDCCH of the serving cell. If a UE does not receive the initial symbol indication signalling, the initial time domain position of PDSCH/ePDCCH of the serving cell may be obtained according to the PCFICH.

Alternatively, in specific implementation, the initial symbol indication signalling includes the initial time domain position of PDSCH/ePDCCH of the serving cell. Here, the PDSCH is scheduled by the ePDCCH.

In an example embodiment, the frequency domain position of the frequency domain ePDCCH is configured by signalling or is a predefined position including fixed N physical resource blocks, of center frequency band, or two system bandwidth sidebands each having N physical resource blocks, or N physical resource blocks mapped to the system bandwidth at intervals, or N physical resource blocks at the center of the system bandwidth; wherein N is a positive integer greater than or equal to 1.

In an example embodiment, when the physical resource block is the same as the physical resource block where the secondary synchronization channel is located, the eREGs corresponding to the physical resource block are not used for transmitting the ePDCCH, and a sending terminal encodes the ePDCCH according to the physical resources with these physical resource blocks removed.

Example Embodiment III

This example embodiment provides a method for mapping an ePDCCH, including the following steps.

Step 1: physical resource block pairs are partitioned into enhanced physical resource element groups.

Step 2: the ePDCCH is mapped to physical resource element groups of one or more corresponding physical resource blocks.

In specific implementation, in the step 1, physical resource block pairs may be partitioned into enhanced resource element groups by the following, manners: numbering the resource elements used for ePDCCH on the physical resource blocks according to the time domain first and then the frequency domain or the frequency domain first and then the time domain, and then partitioning the numbered resource elements into n eREGs. The numbered resource elements are partitioned into n eREGs specifically by one of the following manners:

manner 1: sequentially partitioning at equal intervals, e.g., subjecting indexes of the resource elements to modulus operation over n, and partitioning the resource elements having the same value after the modulus operation into one group;

manner 2: sequentially, continuously partitioning, e.g., continuously partitioning, different enhanced physical resource element groups containing different resource elements;

manner 3: inputting the numbered resource elements into a subblock interleaver, and sequentially partitioning the resource elements output from the subblock interleaver into n eREGs; and manner 4: inputting the numbered resource elements into a subblock interleaver, performing cyclic shift for the resource elements output from the subblock interleaver, and then sequentially partitioning resource elements subjected to the cyclic shift into n eREGs.

In an example embodiment, cyclic shift may be performed according to at least one of: the serial number of the resource group, the serial number of the physical resource block corresponding to the resource group, cell identity, the serial number of subframe, and cyclic shift instruction signalling.

For example, the cyclic shift may be performed according to the serial number of the physical resource block corresponding to the resource group, or the cyclic shift may be performed according to both the serial number of the physical resource block corresponding to the resource group and the serial number of subframe, or the cyclic shift may be, performed according to both the serial number of the physical resource block corresponding to the resource group and the cyclic shift instruction signalling; or the cyclic shift may be performed according to the block serial number of the physical resource corresponding to the resource group, the serial number of subframe, and the cell identity.

In this embodiment, the initial time domain position of the physical resource corresponding to the ePDCCH is relevant to the initial time domain position of the PDSCH on a serving cell where the ePDCCH is located, it will be described below in detail.

The initial time domain position of physical resources corresponding to the ePDCCH is the same as the initial time domain position of a physical downlink shared channel (PDSCH) scheduled by the ePDCCH, wherein the ePDCCH and the PDSCH are in a same serving cell; and when the downlink control information corresponding to the PDSCH of the serving cell is carried by the ePDCCH, the initial time domain position of the PDSCH of the serving cell is determined according to an initial symbol indication signalling.

In specific implementation, the initial symbol indication signalling includes an indication on whether the initial time domain position of PDSCH/ePDCCH of the serving cell is determined according to PCFICH, if not, the initial symbol indication signalling provides the initial time domain position of PDSCH/ePDCCH of the serving cell. If a UE does not receive the initial symbol indication signalling, the initial time domain position of PDSCH/ePDCCH of the serving cell may be obtained according to the PCFICH.

Alternatively, in specific implementation, the initial symbol indication signalling includes the initial time domain position of PDSCH/ePDCCH of the serving cell. Here, the PDSCH is scheduled by the ePDCCH.

In an example embodiment, the frequency domain position of the frequency domain ePDCCH is configured by signalling or is a predefined position including Fixed N physical resource blocks of center frequency band, or two system bandwidth sidebands each having N physical resource blocks, or N physical resource blocks mapped to the system bandwidth at intervals, or N physical resource blocks at the center of the system bandwidth; N is a positive integer greater than or equal to 1.

When the preset physical resource blocks are the same as the physical resource blocks where the secondary synchronization channel is located, the eREGs corresponding to the preset physical resource blocks are not used for transmitting the ePDCCH, and the sending terminal encodes the ePDCCH according to the physical resources with these predefined physical resource blocks removed.

The n value corresponding to the normal cyclic prefix subframe is the same as that of the extended cyclic prefix subframe, or the n values corresponding to the normal cyclic prefix subframe and the extended cyclic prefix subframe are respectively defined according to a predefined scenario including at least one of the following: extended cyclic prefix configured general subframes, normal cyclic prefix configured general subframes, an extended cyclic prefix configured special subframe set 1, an extended cyclic prefix configured special subframe set 2, a normal cyclic prefix configured special subframe set 1, and normal cyclic prefix configured special subframe set 2.

For example, the n value for the extended cyclic prefix configured general subframe is 2, the n value for the normal cyclic prefix configured general subframe is 4, the n value for the extended cyclic prefix configured special subframe set 1 is 1, the n value for the extended cyclic prefix configured special subframe set 2 is 2, the n value for the normal cyclic prefix configured special subframe set 1 is 2, and the n value for the normal cyclic prefix configured special subframe set 2 is 1; alternatively, the n value for the extended cyclic prefix configured general subframe is 2, the n value for the normal cyclic prefix configured general subframe is 4, the n value for the extended cyclic prefix configured special subframe set 1 is 1, the n value for the normal cyclic prefix configured special subframe set 1 is 2, and the n value for normal cyclic prefix configured special subframe set 2 is 1.

In an example embodiment, the normal cyclic prefix configured special subframe set 1 includes special subframe configurations 3, 4 and 8; or the normal cyclic prefix configured special subframe set 1 includes special subframe configurations 1, 2, 6, 7, 3, 4, and 8;

the normal cyclic prefix configured special subframe set 2 includes special subframe configurations 1, 2, 6, and 7;

the extended cyclic prefix configured special subframe set 1 includes special subframe configurations 1, 2, 3, 5, and 6; or the extended cyclic prefix configured special subframe set 1 includes special subframe configurations 1, 2, 3, 4, 5, and 6;

the extended cyclic prefix configured special subframe set 2 includes a special subframe configuration 4.

According to the scheduling situation, the ePDCCH is mapped to physical resource element groups of one or more corresponding physical resource blocks.

Example Embodiment IV

This example embodiment provides a method for sending an ePDCCH, including: partitioning physical resource block pairs into enhanced physical resource element groups; and mapping the ePDCCH to the physical resource element groups of one or more corresponding physical resource blocks.

In specific implementation, physical resource block pairs are partitioned into eREGs specifically by the following manner: numbering the resource elements used for ePDCCH on the physical resource blocks according to the time domain first and then the frequency domain or the frequency domain first and then the time domain, and then partitioning the numbered resource elements into n eREGs. The numbered resource elements are partitioned into n eREGs specifically by one of the following manners:

manner 1: sequentially partitioning at equal intervals, e.g., subjecting indexes of the resource elements to modulus operation over n, and partitioning the resource elements having the same value after the modulus operation into one group;

manner 2: sequentially, continuously partitioning, e.g., continuously partitioning, different enhanced physical resource element groups containing different resource elements;

manner 3: inputting the numbered resource elements into a subblock interleaver, and sequentially partitioning the resource elements output from the subblock interleaver into n eREGs; and manner 4: inputting the numbered resource elements into a subblock interleaver, performing cyclic shift for the resource elements output from the subblock interleaver, and then sequentially partitioning resource elements subjected to the cyclic shift into n eREGs.

The cyclic shift may be performed according to at least one of the serial number of the resource group, the serial number of the physical resource block corresponding to the resource group, cell identity, the serial number of subframe, and cyclic shift instruction signalling.

For example, the cyclic shift may be performed according to the serial number of the physical resource block corresponding to the resource group, or the cyclic shift may be performed according to both the serial number of the physical resource block corresponding to the resource group and the serial number of subframe, or the cyclic shift may be performed according to both the serial number of the physical resource block corresponding to the resource group and the cyclic shift instruction signalling; or the cyclic shift may be performed according to the block serial number of the physical resource corresponding to the resource group, the serial number of subframe, and the cell identity.

In an example embodiment, the initial time domain position of the physical resource corresponding to the ePDCCH is relevant to the initial time domain position of the PDSCH on a serving cell where the ePDCCH is located, it will be described below in detail.

The initial time domain position of physical resources corresponding to the ePDCCH is the same as the initial time domain position of a physical downlink shared channel (PDSCH) scheduled by the ePDCCH, wherein the ePDCCH and the PDSCH are in a same serving cell; and when the downlink control information corresponding to the PDSCH of the serving cell is carried by the ePDCCH, the initial time domain position of the PDSCH of the serving cell is determined according to an initial symbol indication signalling.

In specific implementation, the initial symbol indication signalling includes an indication on whether the initial time domain position of PDSCH/ePDCCH of the serving cell is determined according to PCFICH, if not, the initial symbol indication signalling provides the initial time domain position of PDSCH/ePDCCH of the serving cell. If a UE does not receive the initial symbol indication signalling, the initial time domain position of PDSCH/ePDCCH of the serving cell may be obtained according to the PCFICH.

Alternatively, in specific implementation, the initial symbol indication signalling includes the initial time domain position of PDSCH/ePDCCH of the serving cell. Here, the PDSCH is scheduled by the ePDCCH.

The frequency domain position of the frequency domain ePDCCH is configured by signalling or is a predefined position including fixed N physical resource blocks of center frequency band, or two system bandwidth sidebands each having N physical resource blocks, or N physical resource blocks mapped to the system bandwidth at intervals, or N physical resource blocks at the center of the system bandwidth; N is a positive integer greater than or equal to 1.

In an example embodiment, when the physical resource blocks are the same as the physical resource blocks where the secondary synchronization channel is located, the eREGs corresponding to the physical resource block are not used for transmitting the ePDCCH, and a sending terminal encodes the ePDCCH according to the physical resources with these physical resource blocks removed.

In an example embodiment, the n value corresponding to the normal cyclic prefix subframe is the same as that of the extended cyclic prefix subframe, or the n value is determined according to a predefined scenario including at least one of the following: extended cyclic prefix configured general subframes, normal cyclic prefix configured general subframes, an extended cyclic prefix configured special subframe set 1, an extended cyclic prefix configured special subframe set 2, a normal cyclic prefix configured special subframe set 1, and normal cyclic prefix configured special subframe set 2.

For example, the n value for the extended cyclic prefix configured general subframe is 2, the n value for the normal cyclic prefix configured general subframe is 4, the n value for the extended cyclic prefix configured special subframe set 1 is 1, the n value for the extended cyclic prefix configured special subframe set 2 is 2, the n value for the normal cyclic prefix configured special subframe set 1 is 2, and the n value for the normal cyclic prefix configured special subframe set 2 is 1; alternatively, the n value for the extended cyclic prefix configured general subframe is 2, the n value for the normal cyclic prefix configured general subframe is 4, the n value for the extended cyclic prefix configured special subframe set 1 is 1, the n value for the normal cyclic prefix configured special subframe set 1 is 2, and the n value for normal cyclic prefix configured special subframe set 2 is 1.

In an example embodiment, the normal cyclic prefix configured special subframe set 1 includes special subframe configurations 3, 4 and 8; or the normal cyclic prefix configured special subframe set 1 includes special subframe configurations 1, 2, 6, 7, 3, 4, and 8;

the normal cyclic prefix configured special subframe set 2 includes special subframe configurations 1, 2, 6, and 7;

the extended cyclic prefix configured special subframe set 1 includes special subframe configurations 1, 2, 3, 5, and 6; or the extended cyclic prefix configured special subframe set 1 includes special subframe configurations 1, 2, 3, 4, 5, and 6;

the extended cyclic prefix configured special subframe set 2 includes a special subframe configuration 4.

The determination of eREGs corresponding to the ePDCCH may be implemented by the following manner:

mapping virtual eREGs to eREGs, wherein the eREGs correspond to specific physical resources, the virtual eREGs correspond to logical units of the ePDCCH, the logical unit is configured for allocating resources to the ePDCCH or configured for carrying bit information after encoding the ePDCCH; mapping the ePDCCH to virtual enhanced physical resource element groups according to the scheduling situation, and then mapping the virtual eREGs to the physical resource element groups, wherein the virtual eREGs include continuous virtual eREGs and discrete virtual eREGs;

numbering all physical resource element groups corresponding to the ePDCCH according to the serial number of physical resource block, the specific mapping of the virtual eREGs to the physical resource element groups including:

continuous virtual eREGs are directly mapped to the eREGs having the same serial numbers as the continuous virtual eREGs;

discrete virtual eREGs are directly mapped to predefined eREGs.

In an example embodiment, the discrete virtual eREGs are directly mapped to the predefined eREGs specifically by the following manner:

partitioning the discrete virtual eREGs into discrete virtual eREG sets, different discrete virtual eREG sets containing different discrete virtual eREGs, e.g., by employing a sequential partitioning manner;

partitioning the eREGs into eREGs, different eREG sets containing different eREGs, e.g., by employing a sequential partitioning manner or a manner of extracting at intervals;

arranging one-to-one correspondence between the discrete virtual eREG sets and the eREG sets, e.g., corresponding a discrete virtual eREG set #k to an eREG set #k;

wherein the number of discrete virtual eREGs contained in the discrete virtual eREG set is equal to the number of eREGs contained in the eREG set.

When the eREG set contains 32 eREGs, assuming that the eREGs in the eREG set are numbered as a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, and a31 and the discrete virtual eREGs in the discrete virtual eREG set are numbered as b0, b1, b2, b3, b4, b5, b6, b7, b8, b9, b10, b11, b12, b13, b14, b15, b16, b17, b18, b19, b20, b21, b22, b23, b24, b25, b26, b27, b28, b29, b30, and b31, the correspondence between the discrete virtual eREGs in the discrete virtual eREG set and the eREGs in the eREG set is: a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, a31 respectively correspond to b0, b16, b1, b17, b2, b18, b3, b19, b4, b20, b5, b21, b6, b22, b7, b23, b8, b24, b9, b25, b10, b26, b11, b27, b12, b28, b13, b29, b14, b30, b15, b31; or a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, a31 respectively correspond to b0, b16, b4, b20, b2, b18, b6, b22, b1, b17, b5, b21, b3, b19, b7, b23, b8, b24, b12, b28, b10, b26, b14, b30, b9, b25, b13, b29, b11, b27, b15, b31; or a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, a31 respectively correspond to b0, b16, b4, b20, b1, b17, b5, b21, b2, b18, b6, b22, b3, b19, b7, b23, b8, b24, b12, b28, b9, b25, b13, b29, b10, b26, b14, b30, b11, b27, b15, b31; or a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, a31 respectively correspond to b0, b16, b2, b18, b1, b17, b3, b19, b4, b20, b6, b22, b5, b21, b7, b23, b8, b24, b10, b26, b9, b26, b11, b27, b12, b28, b14, b30, b13, b29, b15, b31; or a0, a1, a1, a3, a4, a5, a6, a7, a8, a9, a10, a11, a12, a13, a14, a15, a16, a17, a18, a19, a20, a21, a22, a23, a24, a25, a26, a27, a28, a29, a30, a31 respectively correspond to b0, b16, b8, b24, b1, b17, b9, b25, b2, b18, b10, b26, b3, b19, b11, b27, b4, b20, b12, b28, b5, b21, b13, b29, b6, b22, b14, b30, b7, b23, b15, b31; or a0, a1, . . . , a31 respectively correspond to b0, b16, b8, b24, b2, b18, b10, b26, b1, b17, b9, b25, b3, b19, b11, b27, b4, b20, b12, b28, b6, b22, b14, b30, b5, b21, b13, b29, b7, b23, b15, b31; or a0, a1, a2, a3, a4, a5, a6, a7, a8, a9, a10, a11, a12, a13, a14, a15, a16, a17, a18, a19, a20, a21, a22, a23, a24, a25, a26, a27, a28, a29, a30, a31 respectively correspond to b0, b16, b8, b24, b4, b20, b12, b28, b1, b17, b9, b25, b5, b21, b13, b29, b2, b18, b10, b26, b6, b22, b14, b30, b3, b19, b11, b27, b7, b23, b15, b31.

When the eREG set contains 16 eREGs, assuming that the eREGs in the eREG set are numbered as a0, a1, a1, a2, a3, a4, a5, a6, a7, a8, a9, a10, a11, a12, a13, a14, and a15 and the discrete virtual eREGs in the discrete virtual eREG set are numbered as b0, b1, b2, b3, b4, b5, b6, b7, b8, b9, b10, b11, b12, b13, b14, and b15, the correspondence between the discrete virtual eREGs in the discrete virtual eREG set and the eREGs in the eREG set is: a0, a1, a2, a3, a4, a5, a6, a7, a8, a9, a10, a11, a12, a13, a14, and a15 correspond to b0, b8, b1, b9, b2, b10, b3, b11, b4, b12, b5, b13, b6, b14, b7, and b15, or a0, a1, a2, a3, a4, a5, a6, a7, a8, a9, a10, a11, a12, a13, a14, and a15 correspond to b0, b8, b2, b10, b1, b9, b3, b11, b4, b12, b6, b14, b5, b13, b7, and b15, or a0, a1, a2, a3, a4, a5, a6, a7, a8, a9, a10, a11, a12, a13, a14, and a15 correspond to b0, b8, b4, b12, b1, b9, b5, b13, b2, b10, b6, b14, b3, b11, b7, and b15, or a0, a1, a2, a3, a4, a5, a6, a7, a8, a9, a10, a11, a12, a13, a14, and a15 correspond to b0, b8, b4, b12, b2, b10, b6, b14, b1, b9, b5, b13, b3, b11, b7, and b15.

When the eREG set contains 8 eREGs, assuming that the eREGs in the eREG set are numbered as a0, a1, a2, a3, a4, a5, a6, and a7 and the discrete virtual eREGs in the discrete virtual eREG set are numbered as b0, b1, b2, b3, b4, b5, b6, and b7, the correspondence between the discrete virtual eREGs in the discrete virtual eREG set and the eREGs in the eREG set is: a0, a1, a2, a3, a4, a5, a6, a7 correspond to b0, b4, b1, b5, b2, b6, b3, b7; or a0, a1, a2, a3, a4, a5, a6, a7 correspond to b0, b4, b2, b6, b1, b5, b3, b7.

The technical solution will be described below in conjunction with multiple examples.

Example 1

When the base station configures 8 physical resource block pairs for transmitting an ePDCCH, one physical resource block pair including 8 eREGs, with 64 eREGs in total, the eREG set may contain 32 eREGs, i.e., all eREGs are partitioned into 2 eREG sets, or the eREG set may contain 16 eREGs, i.e., all eREGs are partitioned into 4 eREG sets, or the eREG set may contain 8 eREGs, i.e., all eREGs are partitioned into 8 eREG sets.

Example 2

When the base station configures 4 physical resource block pairs for transmitting an ePDCCH, one physical resource block pair including 8 eREGs, with 32 eREGs in total, the eREG set may contain 32 eREGs, i.e., all eREGs are partitioned into 1 eREG sets, or the eREG set may contain 16 eREGs, i.e., all eREGs are partitioned into 2 eREG sets, or the eREG set may contain 8 eREGs, i.e., all eREGs are partitioned into 4 eREG sets;

Example 3

When the base station configures 8 physical resource block pairs for transmitting an ePDCCH, one physical resource block pair including 4 eREGs, with 32 eREGs in total, the eREG set may contain 32 eREGs, i.e., all eREGs are partitioned into 1 eREG sets, or the eREG set may contain 16 eREGs, i.e., all eREGs are partitioned into 2 eREG sets, or the eREG set may contain 8 eREGs, i.e., all eREGs are partitioned into 4 eREG sets.

Example 4

When the base station configures 4 physical resource block pairs for transmitting an ePDCCH, one physical resource block pair including 4 eREGs, with 16 eREGs in total, the eREG set may contain 16 eREGs, i.e., all eREGs are partitioned into 1 eREG sets, or the eREG set may contain 8 eREGs, i.e., all eREGs are partitioned into 2 eREG sets.

Example 5

When the base station configures 8 physical resource block pairs for transmitting an ePDCCH, one physical resource block pair including 2 eREGs, with 16 eREGs in total, the eREG set may contain 16 eREGs, i.e., all eREGs are partitioned into 1 eREG sets, or the eREG set may contain 8 eREGs, i.e., all eREGs are partitioned into 2 eREG sets.

By the above-mentioned embodiments, provided are a method and a device for mapping and receiving an ePDCCH, a base station, and user equipment, and the problem of balanced performance among the eREGs corresponding to the ePDCCH can be solved by enabling n eREGs on different physical resources blocks to correspond to different resource element positions in the physical resource blocks and discretely partitioning resource elements corresponding to the physical resource blocks into eREGs, so as to further ensure the stable ePDCCH transmission performance and also reduce the scheduling complexity and improve the resource utilization. It should be noted that not all the above-mentioned embodiments have these technical effects, and only some example embodiments have some of the technical effects.

Obviously, a person skilled in the art shall understand that the above-mentioned components and steps of the disclosure can be realized by using general purpose calculating device, can be integrated in one calculating device or distributed on a network which consists of a plurality of calculating devices. Alternatively, the components and the steps of the disclosure can be realized by using the executable program code of the calculating device. Consequently, they can be stored in the storing device and executed by the calculating device, or they are made into integrated circuit component respectively, or a plurality of components or steps thereof are made into one integrated circuit component. In this way, the disclosure is not restricted to any particular hardware and software combination.

The above description is only example embodiments of the disclosure and is not intended to limit the disclosure, and the disclosure can have a variety of changes and modifications for ordinary person skilled in the field. Any modification, equivalent replacement, or improvement made without departing from the principle of the disclosure should fall within the protection scope of the disclosure.

What is claimed is:

1. A method for sending enhanced Physical Downlink Control Channel (ePDCCH), comprising:
   a base station mapping enhanced resource element groups (eREGs) corresponding to the ePDCCH to different resource elements, wherein each of the eREGs corresponding to the ePDCCH is located in one physical resource block pair, the base station mapping the eREGs corresponding to the ePDCCH to different resource elements comprises: the base station partitioning physical resource block pairs corresponding to the ePDCCH into eREGs, and the base station mapping the ePDCCH to predefined eREGs; and
   the base station sending the ePDCCH on the resource elements;

wherein the base station partitioning the physical resource block pairs corresponding to the ePDCCH into eREGs comprises: the base station numbering resource elements used for the ePDCCH according to an order of a time domain first and then a frequency domain or an order of the frequency domain first and then the time domain; and partitioning the numbered resource elements into eREGs;

wherein partitioning the numbered resource elements into eREGs comprises one of the following: partitioning the numbered resource elements into the eREGs at equal intervals; partitioning the numbered resource elements into the eREGs in a continuous manner according to the sequence of the numbered resource elements; inputting the numbered resource elements into a subblock interleaver, and sequentially partitioning resource elements output from the subblock interleaver into the eREGs; and inputting the numbered resource elements into a subblock interleaver, performing cyclic shift for resource elements output from the subblock interleaver, and then partitioning resource elements subjected to the cyclic shift into the eREGs.

2. The method according to claim 1, wherein the one physical resource block pair comprises n eREGs, and the n eREGs on different physical resource blocks are mapped to different resource element positions in the different physical resource blocks, where n is an integer greater than or equal to 1.

3. The method according to claim 1,
wherein the base station mapping enhanced resource element groups (eREGs) corresponding to the ePDCCH to different resource elements comprises:
the base station mapping the eREGs corresponding to the ePDCCH which is in a same serving cell with the PDSCH to the different resource elements, wherein an initial time domain position of physical resources corresponding to the ePDCCH is configured to be the same as an initial time domain position of a physical downlink shared channel (PDSCH) scheduled by the ePDCCH;

or wherein when downlink control information corresponding to a PDSCH of a serving cell is carried by the ePDCCH, an initial time domain position of the PDSCH of the serving cell is determined according to an initial symbol indication signalling.

4. The method according to claim 1, wherein
the base station mapping enhanced resource element groups (eREGs) corresponding to the ePDCCH to different resource elements comprises:
the base station mapping the eREGs corresponding to the ePDCCH to the different resource elements, wherein a frequency domain position of physical resources corresponding to the ePDCCH is a signalling configured or predefined position, and the predefined position comprises one of the following: two sidebands of a system bandwidth, N physical resource blocks of each of the two sidebands of the system bandwidth, N physical resource blocks in a system which are mapped at intervals, and N physical resource blocks at the center of the system bandwidth, where N is an integer greater than 0.

5. The method according to claim 1, wherein the base station encodes the ePDCCH according to physical resources with one or more predefined physical resource blocks removed, wherein the one or more predefined physical resource blocks are the same as one or more physical resource blocks where a secondary synchronization channel is located, and eREGs corresponding to the one or more predefined physical resource blocks do not carry the ePDCCH.

6. The method according to claim 1, wherein mapping the eREGs corresponding to the ePDCCH to different resource elements comprises:
mapping virtual eREGs to the eREGs, wherein the eREGs correspond to physical resources, and the virtual eREGs correspond to logical units of the ePDCCH; and
the virtual eREGs comprise continuous virtual eREGs and discrete virtual eREGs, wherein the continuous virtual eREGs are mapped to eREGs having the same serial numbers as the continuous virtual eREGs, and the discrete virtual eREGs are mapped to predefined eREGs.

7. The method according to claim 6, wherein mapping the discrete virtual eREGs to the predefined eREGs comprises:
partitioning discrete eREGs into one or more discrete virtual eREG sets;
partitioning the eREGs into one or more eREG sets; and
setting the one or more discrete virtual eREG sets and the one or more eREG sets in a one-to-one correspondence, wherein the number of discrete virtual eREGs in each discrete virtual eREG set is equal to the number of eREGs in each eREG set.

8. The method according to claim 1, wherein the base station mapping enhanced resource element groups (eREGs) corresponding to the ePDCCH to different resource elements comprises:
the base station mapping the eREGs corresponding to the ePDCCH to the different resource elements, wherein the one physical resource block pair contains n eREGs, wherein the n value corresponding to the physical resource block with a normal cyclic prefix subframe is the same as the n value corresponding to the physical resource block with an extended cyclic prefix subframe;
or, the one physical resource block contains n eREGs, wherein the n value is determined according to a predefined scenario, wherein the predefined scenario comprises at least one of the following: extended cyclic prefix configured general subframes, normal cyclic prefix configured general subframes, an extended cyclic prefix configured special subframe set 1, an extended cyclic prefix configured special subframe set 2, a normal cyclic prefix configured special subframe set 1, and a normal cyclic prefix configured special subframe set 2, and n is an integer greater than or equal to 1.

9. A method for receiving enhanced Physical Downlink Control Channel (ePDCCH), comprising:
user equipment (UE) determining resource elements to which enhanced resource element groups (eREGs) corresponding to an ePDCCH are mapped, wherein each of the eREGs corresponding to the ePDCCH is located in one physical resource block pair; and
the UE receiving the ePDCCH on the resource elements;
wherein the eREGs corresponding to the ePDCCH are mapped to different resource elements by the following manners: the base station partitioning physical resource block pairs corresponding to the ePDCCH into eREGs; and the base station mapping the ePDCCH to predefined eREGs; wherein the base station partitioning the physical resource block pairs corresponding to the ePDCCH into the eREGs comprises: the base station numbering resource elements used for the ePDCCH according to an order of a time domain first and then a frequency domain or an order of the frequency domain first and then the time domain; and partitioning the numbered resource elements into eREGs;

wherein partitioning the numbered resource elements into eREGs comprises one of the following: partitioning the numbered resource elements into the eREGs at equal intervals; partitioning the numbered resource elements into the eREGs in a continuous manner according to the sequence of the numbered resource elements; inputting the numbered resource elements into a subblock interleaver, and sequentially partitioning resource elements output from the subblock interleaver into the eREGs; and inputting the numbered resource elements into a subblock interleaver, performing cyclic shift for resource elements output from the subblock interleaver, and then partitioning resource elements subjected to the cyclic shift into the eREGs.

10. The method according to claim 9, wherein
an initial time domain position of physical resources corresponding to the ePDCCH is the same as an initial time domain position of a physical downlink shared channel (PDSCH) scheduled by the ePDCCH, wherein the ePDCCH and the PDSCH are in a same serving cell.

11. The method according to claim 9, wherein mapping the eREGs corresponding to the ePDCCH to different resource elements comprises:
mapping virtual eREGs to the eREGs, wherein the eREGs correspond to physical resources, and the virtual eREGs correspond to logical units of the ePDCCH; and
the virtual eREGs comprise continuous virtual eREGs and discrete virtual eREGs, wherein the continuous virtual eREGs are mapped to eREGs having the same serial numbers as the continuous virtual eREGs, and the discrete virtual eREGs are mapped to predefined eREGs.

12. The method according to claim 11, wherein mapping the discrete virtual eREGs to the predefined eREGs comprises:
partitioning discrete eREGs into one or more discrete virtual eREG sets;
partitioning the eREGs into one or more eREG sets; and
setting the one or more discrete virtual eREG sets and the one or more eREG sets in a one-to-one correspondence, wherein the number of discrete virtual eREGs in each discrete virtual eREG set is equal to the number of eREGs in each eREG set.

13. The method according to claim 9, wherein the base station mapping enhanced resource element groups (eREGs) corresponding to the ePDCCH to different resource elements comprises:
the base station mapping the eREGs corresponding to the ePDCCH to the different resource elements, wherein the one physical resource block pair contains n eREGs, wherein the n value corresponding to the physical resource block with a normal cyclic prefix subframe is the same as the n value corresponding to the physical resource block with an extended cyclic prefix subframe;
or, the one physical resource block contains n eREGs, wherein the n value is determined according to a predefined scenario, wherein the predefined scenario comprises at least one of the following: extended cyclic prefix configured general subframes, normal cyclic prefix configured general subframes, an extended cyclic prefix configured special subframe set 1, an extended cyclic prefix configured special subframe set 2, a normal cyclic prefix configured special subframe set 1, and a normal cyclic prefix configured special subframe set 2, and n is an integer greater than or equal to 1.

14. A device for sending enhanced Physical Downlink Control Channel (ePDCCH) applied to a base station, wherein the device for sending the ePDCCH comprises:
a first mapping component configured to map enhanced resource element groups (eREGs) corresponding to the ePDCCH to different resource elements, wherein each of the eREGs corresponding to the ePDCCH is located in one physical resource block pair, and the first mapping component comprises: a second partitioning component configured to partition physical resource block pairs corresponding to the ePDCCH into eREGs, and a third mapping component configured to map the ePDCCH to predefined eREGs; and
a sending component configured to send the ePDCCH on the resource elements;
wherein the second partitioning component comprises: a numbering component configured to number resource elements used for the ePDCCH according to an order of a time domain first and then a frequency domain or an order of the frequency domain first and then the time domain; and a third partitioning component configured to partition the numbered resource elements into eREGs;
wherein the third partitioning component is configured to partition the numbered resource elements into eREGs by one of the following manners: partitioning the numbered resource elements into the eREGs at equal intervals; partitioning the numbered resource elements into the eREGs in a continuous manner according to the sequence of the numbered resource elements; inputting the numbered resource elements into a subblock interleaver, and sequentially partitioning resource elements output from the subblock interleaver into the eREGs; and inputting the numbered resource elements into a subblock interleaver, performing cyclic shift for resource elements output from the subblock interleaver, and then partitioning resource elements subjected to the cyclic shift into the eREGs.

15. The device according to claim 14, wherein
an initial time domain position of physical resources corresponding to the ePDCCH is configured to be the same as an initial time domain position of a physical downlink shared channel (PDSCH) scheduled by the ePDCCH, wherein the ePDCCH and the PDSCH are in a same serving cell.

16. The device according to claim 14, wherein the first mapping component is configured to map the eREGs corresponding to ePDCCH to different resource elements by the following manners:
mapping virtual eREGs to the eREGs, wherein the eREGs correspond to physical resources, and the virtual eREGs correspond to logical units of the ePDCCH; and
the virtual eREGs comprise continuous virtual eREGs and discrete virtual eREGs, wherein the continuous virtual eREGs are mapped to eREGs having the same serial numbers as the continuous virtual eREGs, and the discrete virtual eREGs are mapped to predefined eREGs.

17. The device according claim 16, wherein the first mapping component is configured to map the discrete virtual eREGs to the predefined eREGs by the following manners:

partitioning discrete eREGs into one or more discrete virtual eREG sets;

partitioning the eREGs into one or more eREG sets; and setting the one or more discrete virtual eREG sets and the one or more eREG sets in a one-to-one correspondence, wherein the number of discrete virtual eREGs in each discrete virtual eREG set is equal to the number of eREGs in each eREG set.

18. The device according to claim 14, wherein the one physical resource block pair contains n eREGs, wherein the n value corresponding to the physical resource block with a normal cyclic prefix subframe is the same as the n value corresponding to the physical resource block with an extended cyclic prefix subframe;

or, the one physical resource block contains n eREGs, wherein the n value is determined according to a predefined scenario, wherein the predefined scenario comprises at least one of the following: extended cyclic prefix configured general subframes, normal cyclic prefix configured general subframes, an extended cyclic prefix configured special subframe set 1, an extended cyclic prefix configured special subframe set 2, a normal cyclic prefix configured special subframe set 1, and normal cyclic prefix configured special subframe set 2, and n is an integer greater than or equal to 1.

19. A base station comprising the device for sending the ePDCCH according to claim 14.

20. A device for receiving an enhanced Physical Downlink Control Channel (ePDCCH) applied to user equipment (UE), wherein the device for receiving the ePDCCH comprises:

a determination component configured to determine resource elements to which configured for determining corresponding to the ePDCCH are mapped, wherein each of the eREGs corresponding to the ePDCCH is located in one physical resource block pair; and a receiving component configured to receive the ePDCCH on the resource elements;

wherein the eREGs corresponding to the ePDCCH are mapped to different resource elements by the following manners: partitioning physical resource block pairs corresponding to the ePDCCH into eREGs; and mapping the ePDCCH to predefined eREGs; wherein partitioning the physical resource block pairs corresponding to the ePDCCH into the eREGs comprises: numbering resource elements used for the ePDCCH according to an order of a time domain first and then a frequency domain or an order of the frequency domain first and then the time domain; and partitioning the numbered resource elements into eREGs;

wherein partitioning the numbered resource elements into eREGs comprises one of the following: partitioning the numbered resource elements into the eREGs at equal intervals; partitioning the numbered resource elements into the eREGs in a continuous manner according to the sequence of the numbered resource elements; inputting the numbered resource elements into a subblock interleaver, and sequentially partitioning resource elements output from the subblock interleaver into the eREGs; and inputting the numbered resource elements into a subblock interleaver, performing cyclic shift for resource elements output from the subblock interleaver, and then partitioning resource elements subjected to the cyclic shift into the eREGs.

21. User equipment (UE) comprising the device for receiving the ePDCCH according to claim 20.

* * * * *